United States Patent [19]

Engdahl

[11] Patent Number: 5,561,297
[45] Date of Patent: Oct. 1, 1996

[54] SCATTER CORRECTING GAMMA-RAY CAMERA

[75] Inventor: John C. Engdahl, Columbia, Md.

[73] Assignee: Sopha Medical Systems, Inc., Columbia, Md.

[21] Appl. No.: 90,529

[22] Filed: Jul. 12, 1993

[51] Int. Cl.$^6$ .................................................. G01T 1/20
[52] U.S. Cl. ............... 250/369; 364/413.24; 250/363.07
[58] Field of Search ................... 378/901, 7, 62; 250/369, 363.07, 363.09; 364/413.24

[56] References Cited

U.S. PATENT DOCUMENTS

| | | | |
|---|---|---|---|
| 3,011,057 | 11/1961 | Anger | 250/71.5 |
| 4,095,108 | 6/1978 | Inbar et al. | 250/369 |
| 4,258,428 | 3/1981 | Woronowicz | 364/527 |
| 4,839,808 | 6/1989 | Koral et al. | 364/413.24 |
| 4,873,632 | 10/1989 | Logan et al. | 364/413.13 |
| 4,918,713 | 4/1990 | Honda | 378/99 |
| 5,081,581 | 1/1992 | Koral et al. | 364/413.24 |
| 5,293,195 | 3/1994 | Berlad et al. | 364/413.24 |
| 5,371,672 | 12/1994 | Motomura et al. | 364/413.24 |

*Primary Examiner*—David P. Porta
*Assistant Examiner*—David Vernon Bruce
*Attorney, Agent, or Firm*—Rothwell, Figg, Ernst & Kurz

[57] ABSTRACT

A method of obtaining scatter-corrected images from a nuclear imaging apparatus such as a gamma-ray camera involves the use of a calibration step which measures the energy spectrum response of the apparatus to unscattered gamma-ray events as a function of spatial location, and a correction step which deconvolves the unscattered distribution from a distribution measured in the presence of scatter by using the calculated calibration response function. The method eliminates the necessity of performing a spatially dependent energy correction for detected radiation image events.

19 Claims, 25 Drawing Sheets

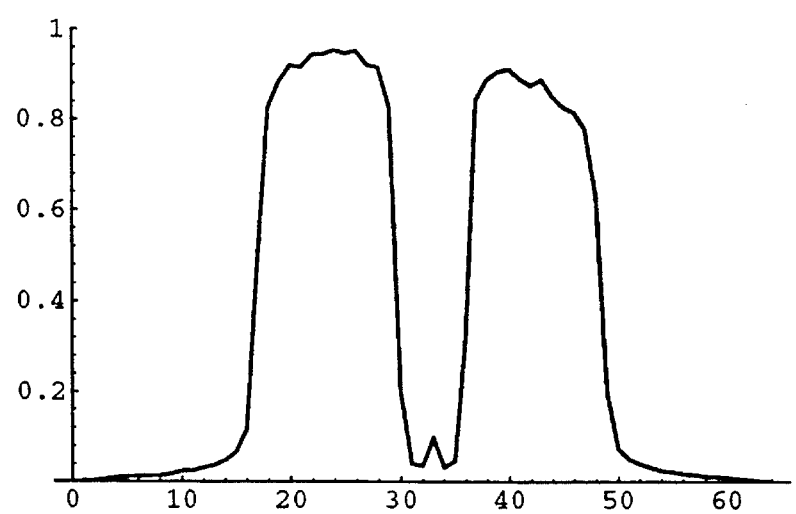
Fig. 3 Spatial distribution (profile) of the radiation from the test object imaged in Figs. 2A-2K.

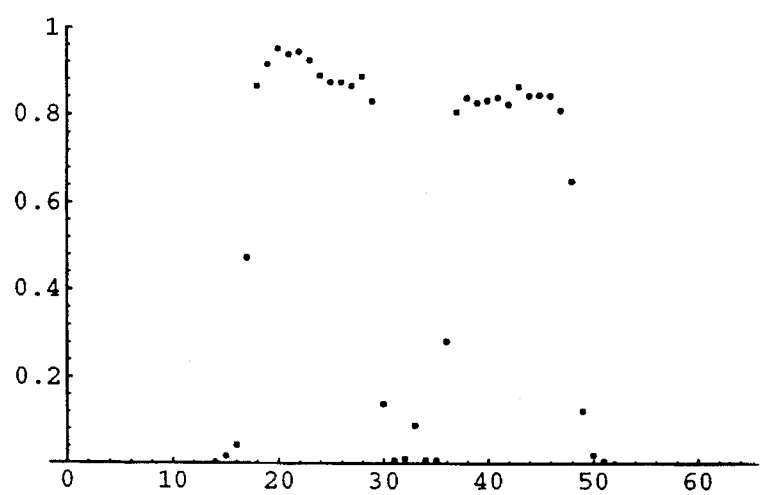
Fig. 4 Graph of the data points obtained by scatter-correcting the distribution of Fig. 3 according to the present invention.

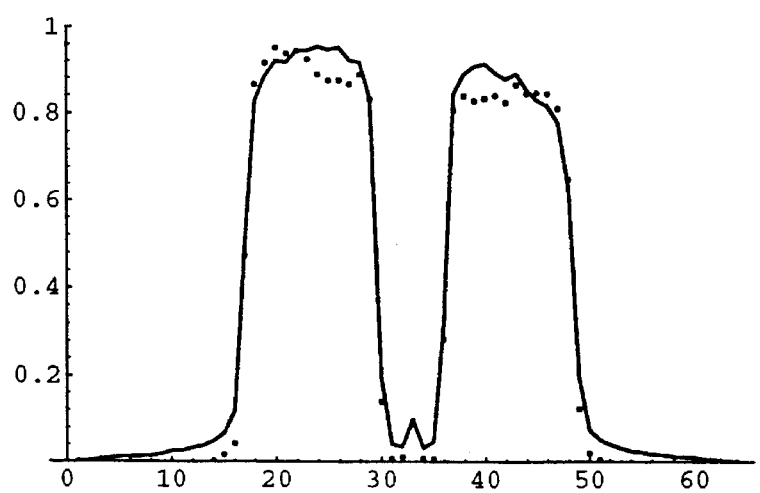
Fig. 5 Graph showing the scatter-corrected image profile of Fig. 4 overlayed on the scatter image profile of Fig. 3.

SCATTER CORRECTING GAMMA-RAY CAMERA

BACKGROUND OF THE INVENTION

1. Field of the Invention

The present invention relates generally to imaging devices for nuclear medicine, and more specifically relates to gamma-ray or scintillation cameras and methods of obtaining images from radiation data acquired by such cameras by compensating for scattered radiation detected by the camera.

2. Background and Prior Art

A gamma-ray or scintillation camera as utilized in nuclear medicine is a well known device. The original scintillation camera or "Anger camera" (named after the inventor) is described in U.S. Pat. No. 3,011,057. The Anger camera uses a scintillation crystal, such as a NaI crystal, which absorbs incident gamma rays from the object under study and interacts with the gamma ray to produce light events. An array of photomultiplier tubes is placed adjacent to the crystal in order to detect and amplify these light events so as calculate the spatial location and energy level of the incident gamma ray to produce a two dimensional image of the object which then may be displayed on a CRT or printed as a hard copy.

When a nuclear medical image is being acquired, a radioisotope has been introduced into the body as a radiopharmaceutical having an affinity for certain parts or organs of the body, and the diagnostician is interested in the distribution of that radiopharmaceutical within the body or organ under evaluation. It is therefore desirable that the image accurately represent the spatial distribution of the radiation emitted from the body. When radioactive nuclei decay, a gamma-ray or high energy X-ray is emitted from the location of the decay. The gamma-rays (or X-rays) travel in a straight line until they are either scattered or absorbed. If a gamma-ray is absorbed in the scintillation crystal of the camera and detected as a light event without having undergone an intervening scattering event, then the location at which the gamma-ray was detected represents the actual location of the decay, and hence part of the distribution of the radioisotope. Such an event is considered a "good." detected event and is used to form an accurate picture of the radioisotope distribution within the body. However, if the gamma-ray scatters within the body at some point between its emission from the location of decay and its detection in the scintillation crystal, then the location at which the scattered gamma-ray is detected does not represent the location from which the gamma-ray was emitted, and thus the inclusion of such an event in the image will falsely indicate the presence of radioisotope where, in actuality, there may not have been any radioisotope. Such an event is known as a "bad" event.

The phenomenon by which a gamma-ray collides with an electron (of an atom of the body, for example), loses some of its energy and changes its direction of travel is known as Compton scattering. Because the scattered gamma-ray energy is lower than the energy of the unscattered gamma-ray, it is the energy of a gamma-ray event that is used to discriminate among detected gamma-ray events so as to include only unscattered gamma-ray events in the image being acquired. When a single gamma-ray is absorbed in the scintillation crystal, a fraction of the deposited energy is emitted as scintillation photons which have wavelengths within the visible spectrum. Because the scintillation photons are emitted isotropically from the point of absorption, only a small amount of the emitted photons reach the photomultiplier tubes (PMTs). The fraction of the total amount of photons reaching the photomultiplier tubes that produces an electrical signal in any one photomultiplier tube is dependent on the position of that photomultiplier tube relative to the location of the light event, local variations in physical properties of the crystal, reflective surfaces, other transparent media such as lightpipes, and the interfaces between all of these materials and the boundaries of the detector. Additionally, the probability that a scintillation photon entering a photomultiplier tube will be converted into an electrical pulse is dependent on local variations in the photocathode of the photomultiplier tube. This probability is known as the quantum efficiency of the photocathode. The quantum efficiency is highly dependent on the thickness and composition of the photocathode, and is thus variable from PMT to PMT as well as locally within a PMT.

The sum of all electrical pulses produced by the PMTs of a scintillation camera is proportional to the fraction of photons reaching the PMTs, which is proportional to the total number of photons emitted from the crystal as a result of interaction with an absorbed gamma-ray, and which is thus also proportional to the energy of the absorbed gamma-ray. This proportionality, however, includes a statistical uncertainty as a result of the random nature of the scintillation photon production, collection and conversion to electrons. Thus, the sum signal of all electrical pulses from the PMTs in response to a light event in the crystal, rather than representing the actual energy of the absorbed gamma-ray, merely represents a sample from a statistical distribution function which describes the relationship of the sum signal to the energy of the gamma-ray. For example, a million gamma-rays having identical energies, being absorbed in exactly the same position in the crystal, and with a constant arrangement and properties of the PMTs, will produce a distribution of measured sum signals that is approximately Gaussian (if the mean number of detected photons is greater than 20 as it would be for all practical detected events). At a different position within the detector crystal, however, a different Gaussian distribution would be measured because a different mean number of photons would be produced as a result of local variations in the properties of the crystal and variations in the materials and thicknesses of the photocathodes of the PMTs. The integral of the sum signal is known as the energy signal, which is proportional to the total number of scintillation photons emitted by the gamma-ray and thus is proportional to the energy of the detected gamma-ray. Measurement of the energy signal is used to determine the probability that the detected gamma-ray is scattered, and therefore should not be part of the acquired image, or the probability that the gamma-ray is not scattered and should contribute to the image being formed.

It is conventional in present commercial gamma-ray cameras to measure the energy of the detected gamma-rays, correct the measured energy to account for spatial variations in signal generation, and then to include in the image only those events whose energies fall within a window, or narrow range, of energies. Various methods of compensating for the spatial energy variation have been proposed and utilized in commercial cameras. George, Raynaud, and Soussaline, *Correction Automatique de la Dependance en Position de l'Energie*, 11$^e$ Colloque International Sur la Fixation Renale du Hg Radioactif, Paris, 24–25 Oct. 1975, used spatially dependent, multiplicative correction factors which were stored in a look-up table according to the spatial position of the detected event and which were multiplied by the energy signal so that the mean of the energy distribution would be the same for any position within the detector area. U.S. Pat. No. 4,095,108 disclosed the use of an offset, or additive, correction factor that could be applied to either the energy signal or the energy window. However, application of a fixed width energy window to a spatially corrected energy signal, while taking into account the spatial variations in the energy distribution and thus minimizing the width of the energy window, fails to eliminate many spurious gamma-ray events which have scattered through small angles, because such events still have energies which fall within the energy window. In fact, use of a minimum width energy window actually excludes some unscattered events from the image because such a window by nature must cut off the tails of the photopeak distribution function of the unscattered event energies.

Methods have been proposed to make more accurate corrections to eliminate the contribution of Compton scatter events to an image. For example, U.S. Pat. No. 4,839,808 to Koral et al., incorporated by reference herein, discloses a method wherein the energy spectrum of events is analyzed to separate Compton scattering components from the unscattered components. This method uses a fitted shape for the unscattered components of the spectrum; however, the correction is performed after a spatially dependent energy correction has already been applied. There remains a need for improvement in the art so as to eliminate more Compton scatter events from an image, while including more unscattered events for contribution to the image.

SUMMARY OF THE INVENTION

The present invention overcomes the problems noted above by eliminating the spatially dependent energy correction and measurement against a narrow energy window and instead applying a scatter elimination technique directly to the detected distributions of gamma-ray events from a radiation field. The invention involves the use of a calibration method wherein the distribution of the energy spectrum of unscattered radiation events is measured as a function of spatial position within the field of view (FOV) of the gamma-ray camera, and a correction method which deconvolves the unscattered distribution from a distribution measured when scattering is present (i.e., under normal clinical imaging conditions).

In particular, the present invention provides a method of obtaining an image of a distributed field of radiation in the presence of scattered radiation from acquired radiation event data detected by a nuclear imaging apparatus, which acquired radiation event data includes scattered radiation event data, comprising the steps of acquiring image data of a uniform flood field of radiation in the absence of scattered radiation for each of a plurality of energy ranges corresponding to energy states of detected radiation events from said uniform flood field; grouping said image data for each of said plurality of energy ranges into a plurality of image elements corresponding to spatial locations in a field of view of said nuclear imaging apparatus; for each of said image elements, calculating a response of said nuclear imaging apparatus by fitting a calibration function to the distribution of data over the entirety of said plurality of energy ranges; acquiring image data of said distributed field of radiation for each of said plurality of energy ranges; grouping said distributed field image data for each of said plurality of energy ranges into said plurality of image elements; for each of said image elements of said distributed field image data, fitting a combination of a particular scattered radiation spectrum and the calculated response of the nuclear imaging apparatus to the distribution of data points over the entirety of the plurality of energy ranges by calculating fitted parameters of said combination such that the combination is a best fit to the distribution of data points; deriving unscattered image data from said calculated fitted parameters; and obtaining said image of said distributed field of radiation from said derived unscattered image data.

The present invention further provides a method wherein for each of said image elements of said distributed field image data, a scattered radiation spectrum is calculated by fitting a scatter function to the distribution of data over the entirety of said plurality of energy ranges; scatter data corresponding to said calculated scattered radiation spectrum is subtracted from said image data of each of said image elements of said distributed field image data; a photopeak function of unscattered image data is calculated for each of said image elements by fitting said calculated response of said nuclear imaging apparatus to said scatter-subtracted data; and unscattered image data is derived from said calculated photopeak functions.

BRIEF DESCRIPTION OF THE DRAWINGS

The present invention will become more fully understood from the detailed description given hereinbelow and the accompanying drawings, which are given by way of illustration only and which are not limitative of the present invention, and wherein:

FIG. 3 is a graph of a spatial distribution of the radiation from the test object imaged in FIGS. 2A–2K;

FIG. 4 is a graph plot of data points obtained by scatter-correcting the distribution of FIG. 3 according to the present invention; and FIG. 5 is a graph showing the scatter-corrected image profile of FIG. 4 overlayed on the scatter image profile of FIG. 3.

DETAILED DESCRIPTION OF THE PREFERRED EMBODIMENTS

Figure 1A:
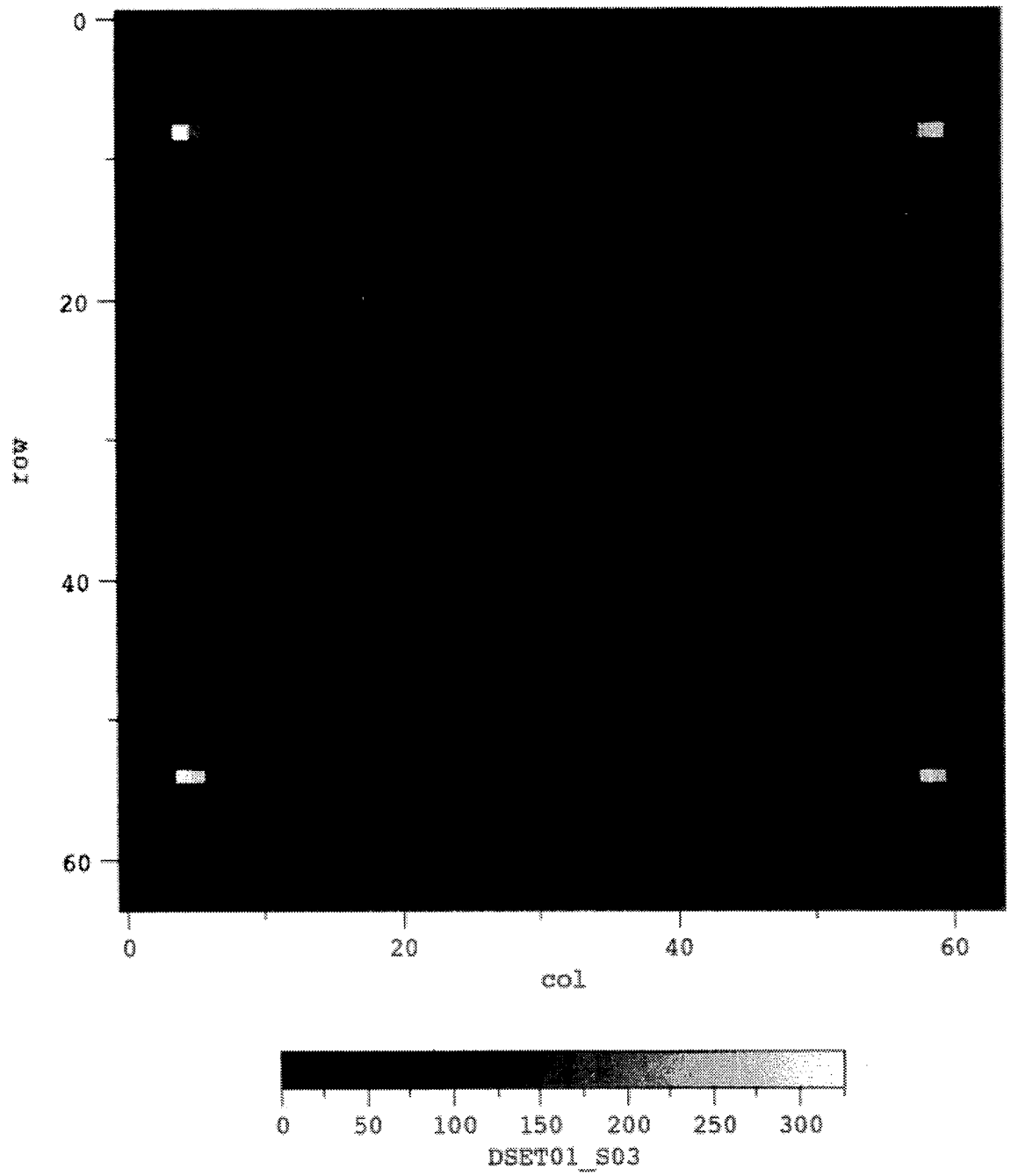
FIGS. 1A–1K are computer generated views of a sequence of images taken at different narrow energy ranges of a uniform flood field of radiation in the absence of a scattered gamma-rays.
Figure 1B:
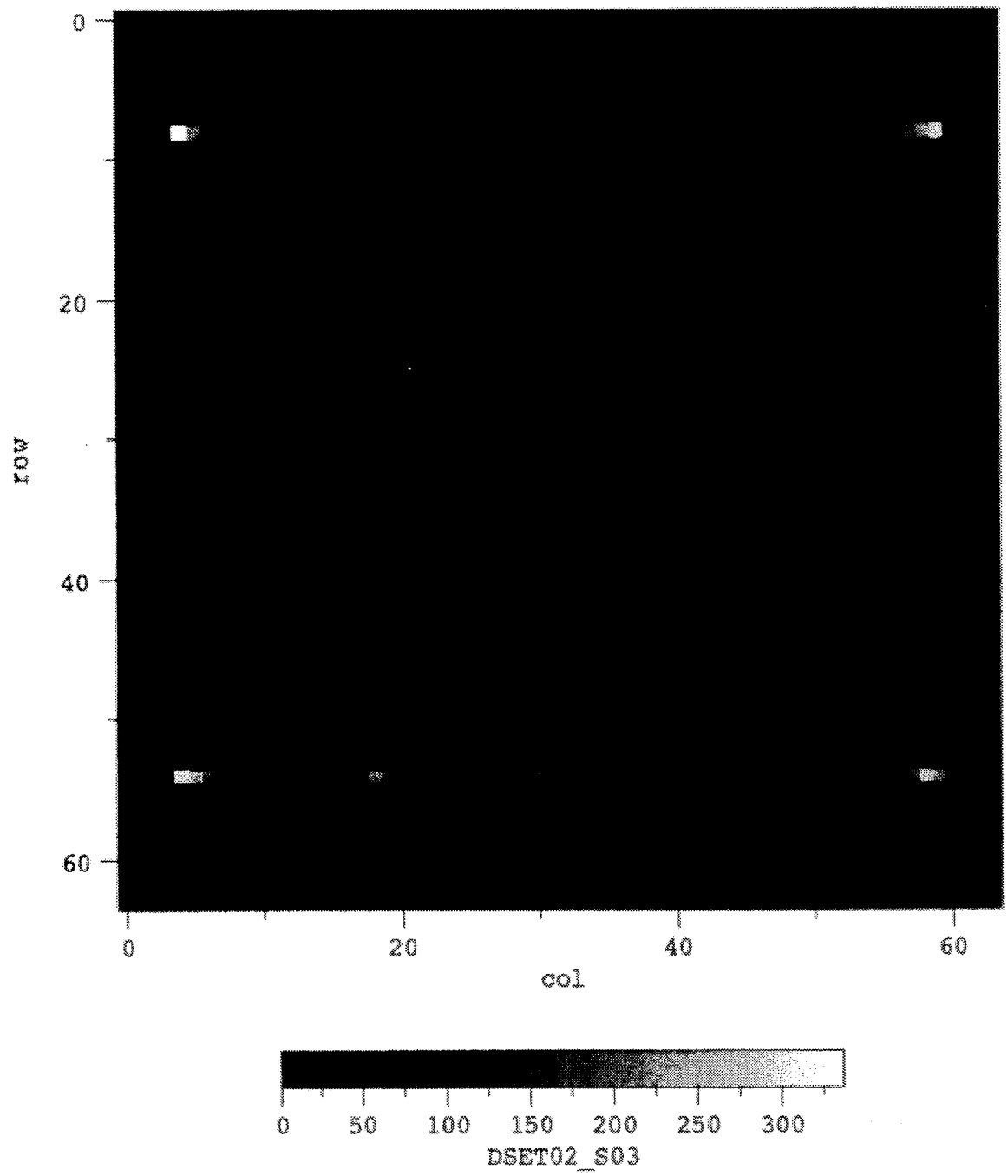
Figure 1C:
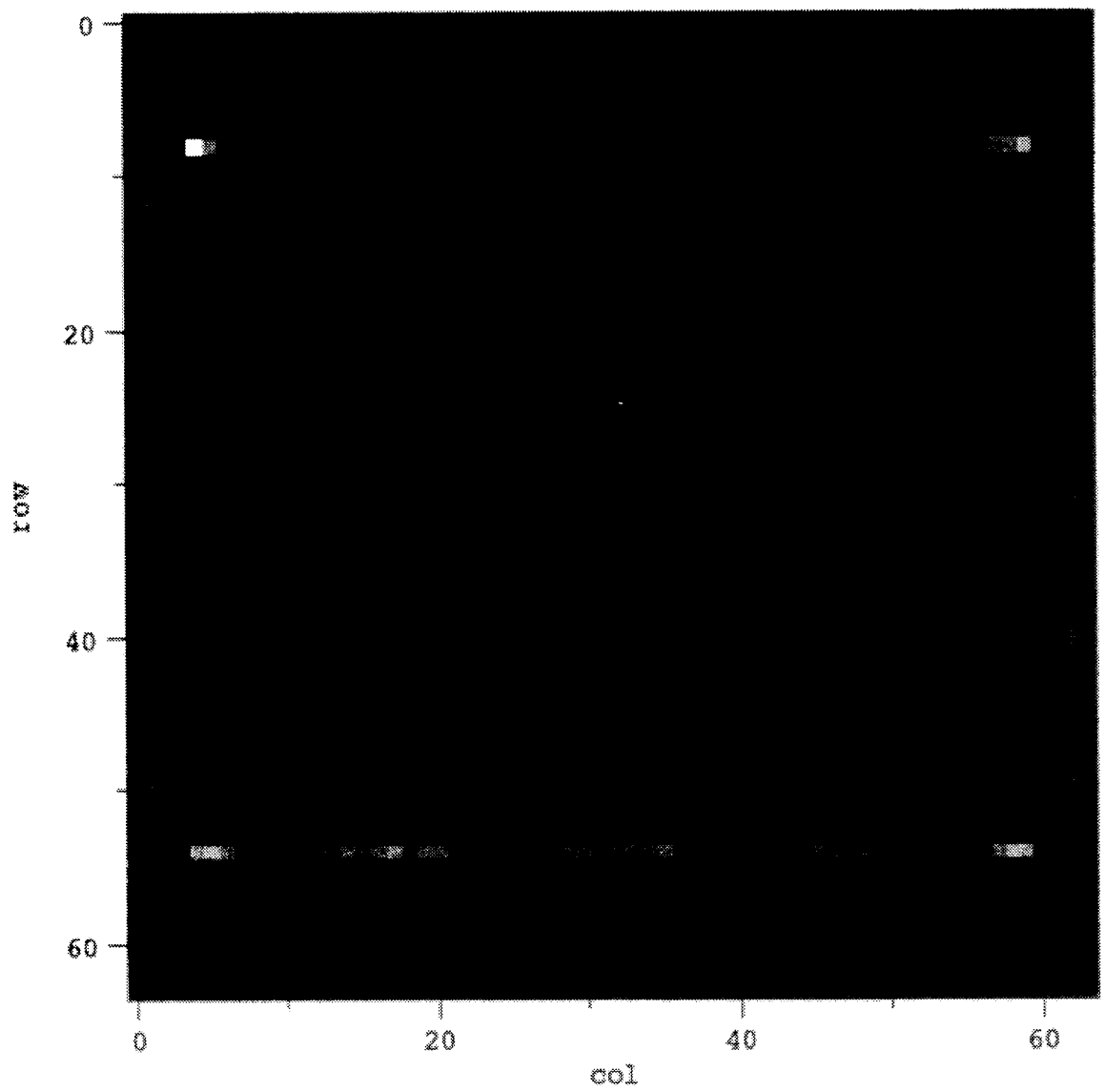
Figure 1D:
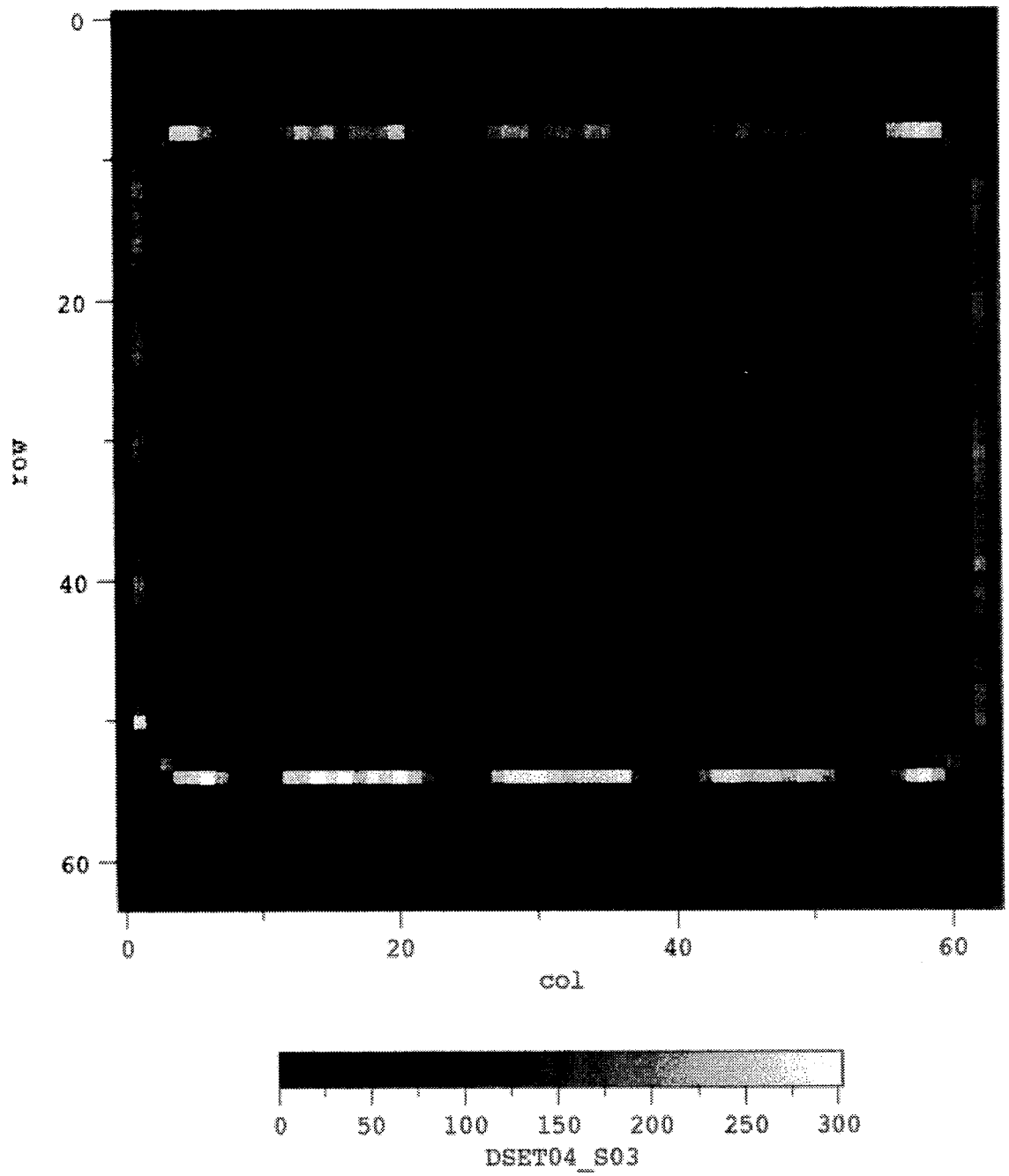
Figure 1E:
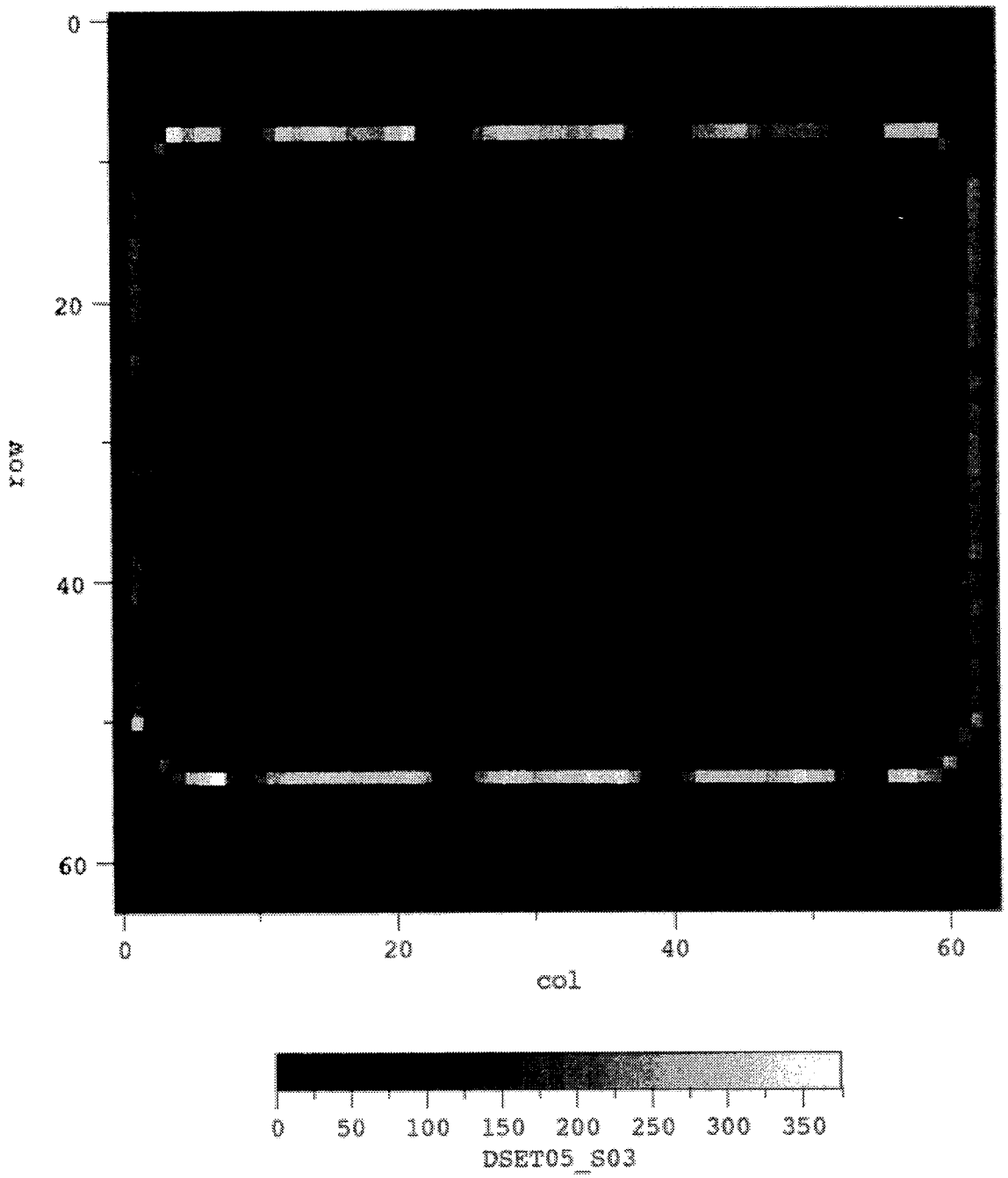
Figure 1F:
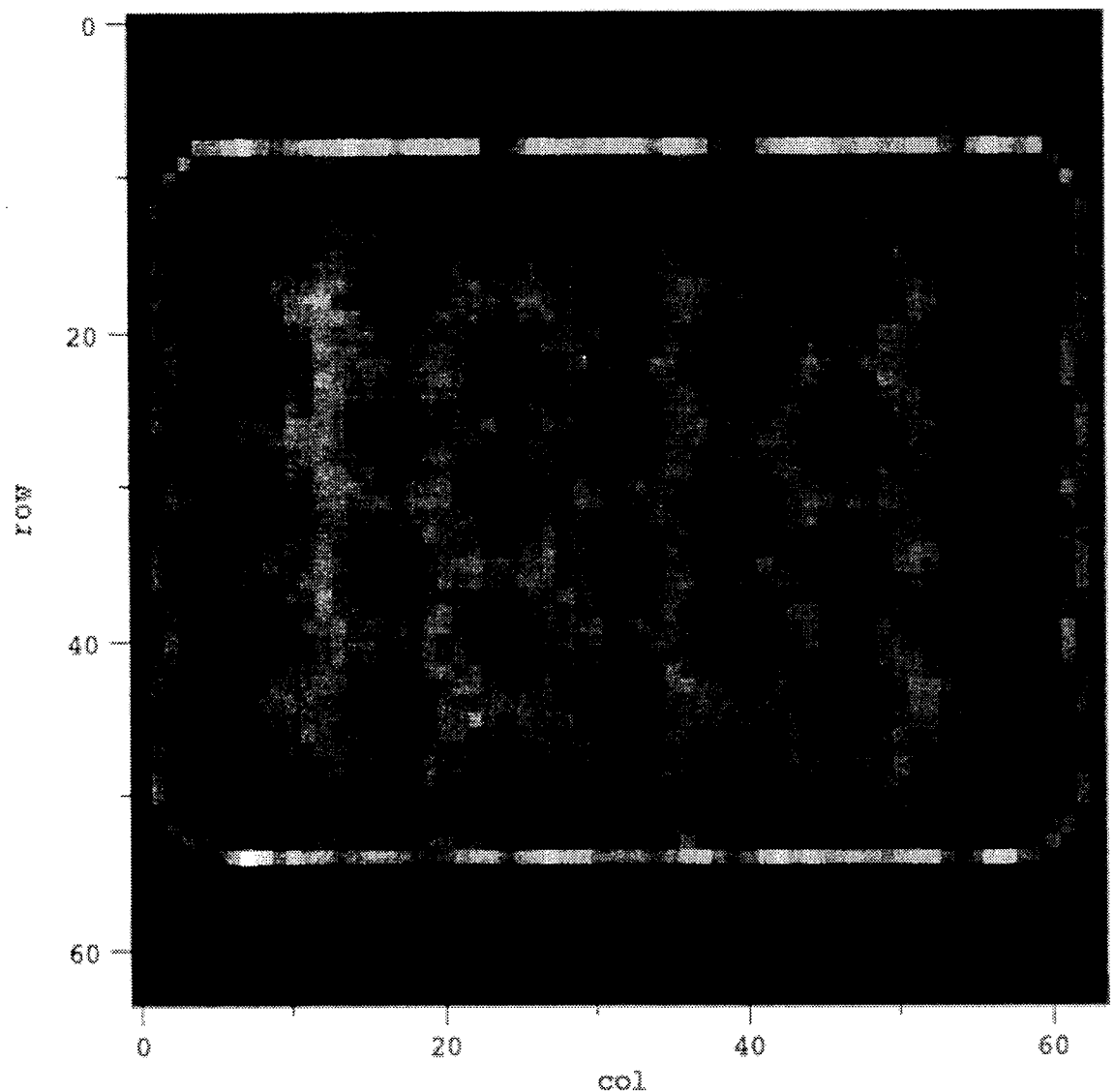
Figure 1G:
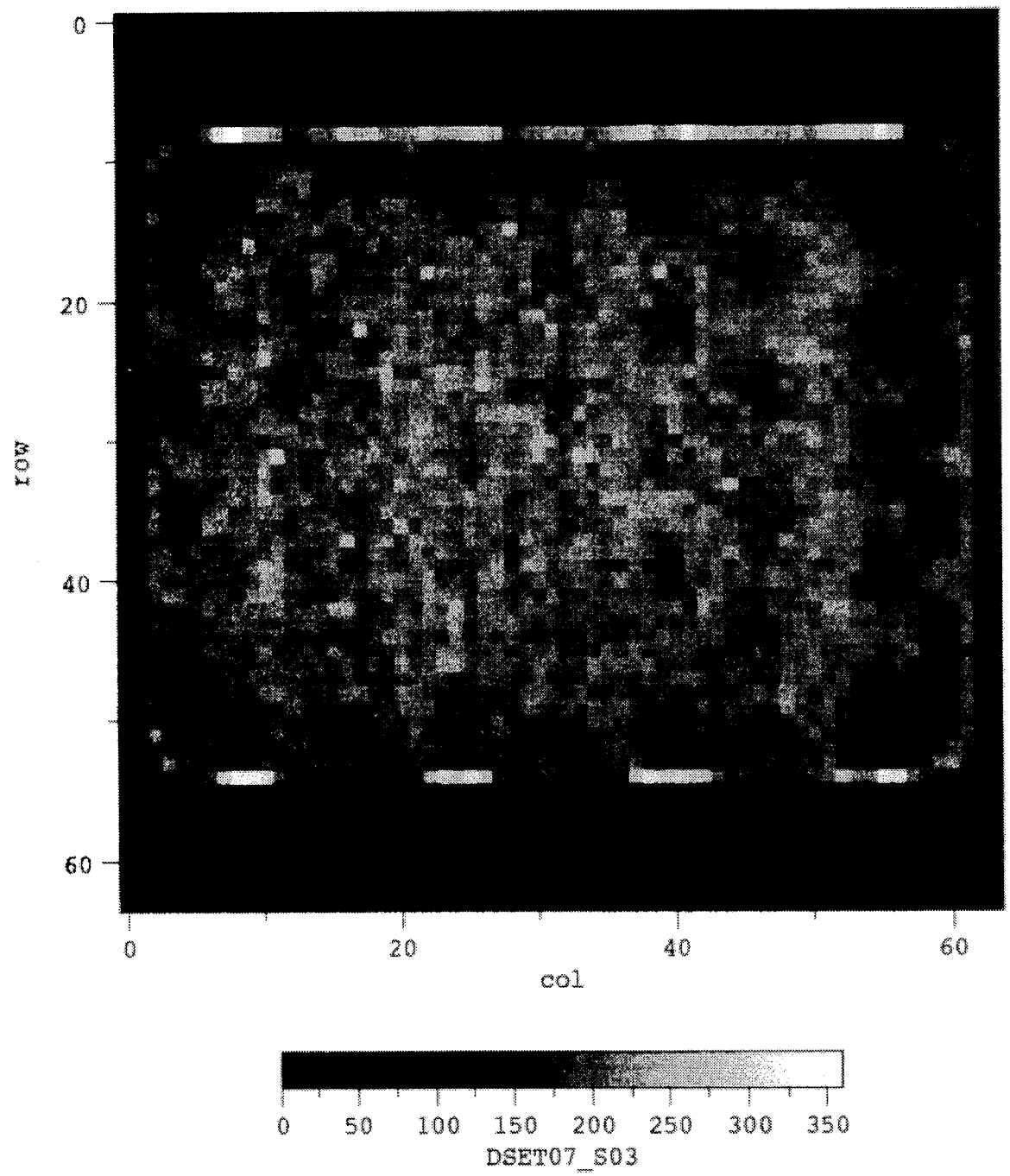
Figure 1H:
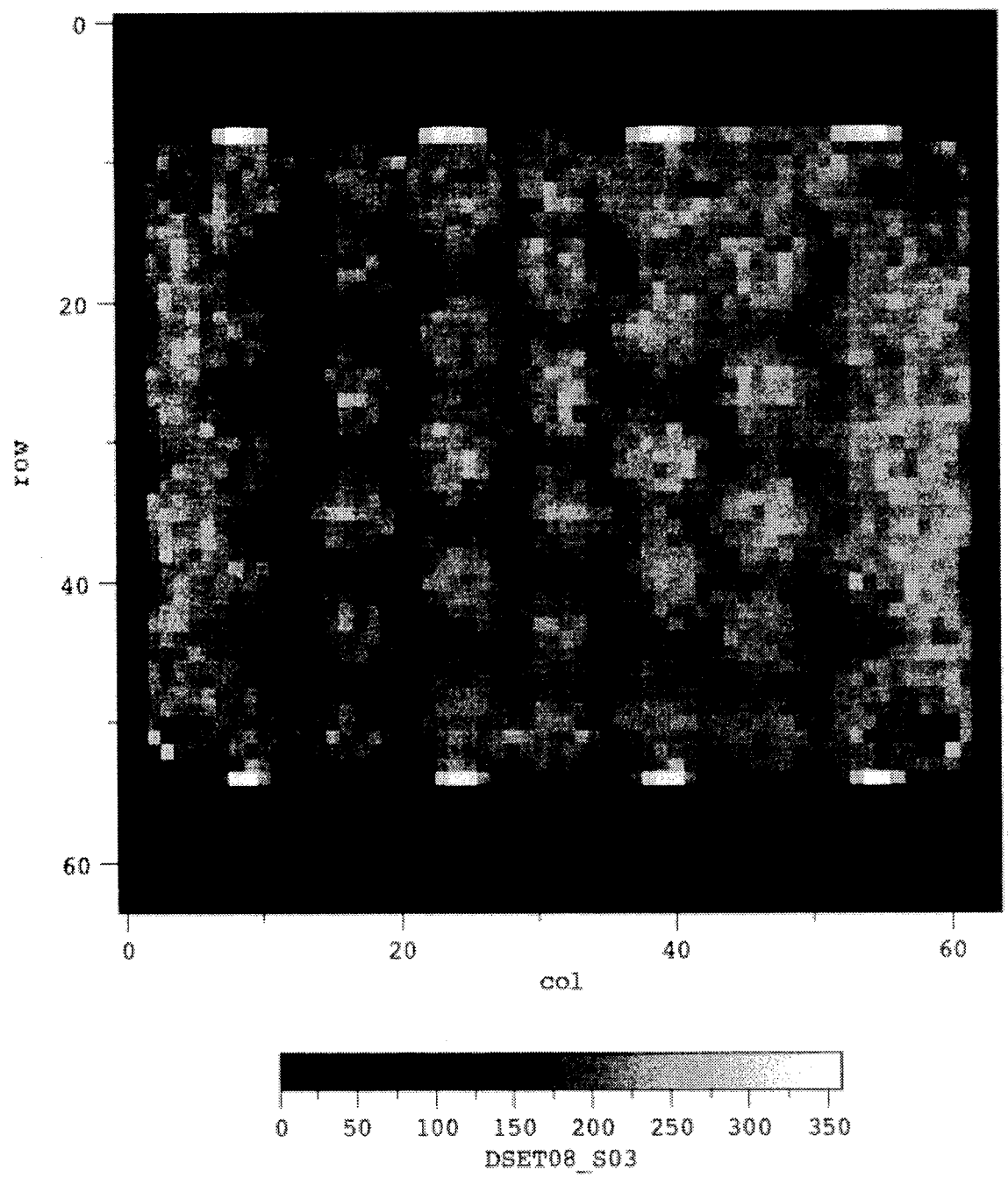
Figure 1I:
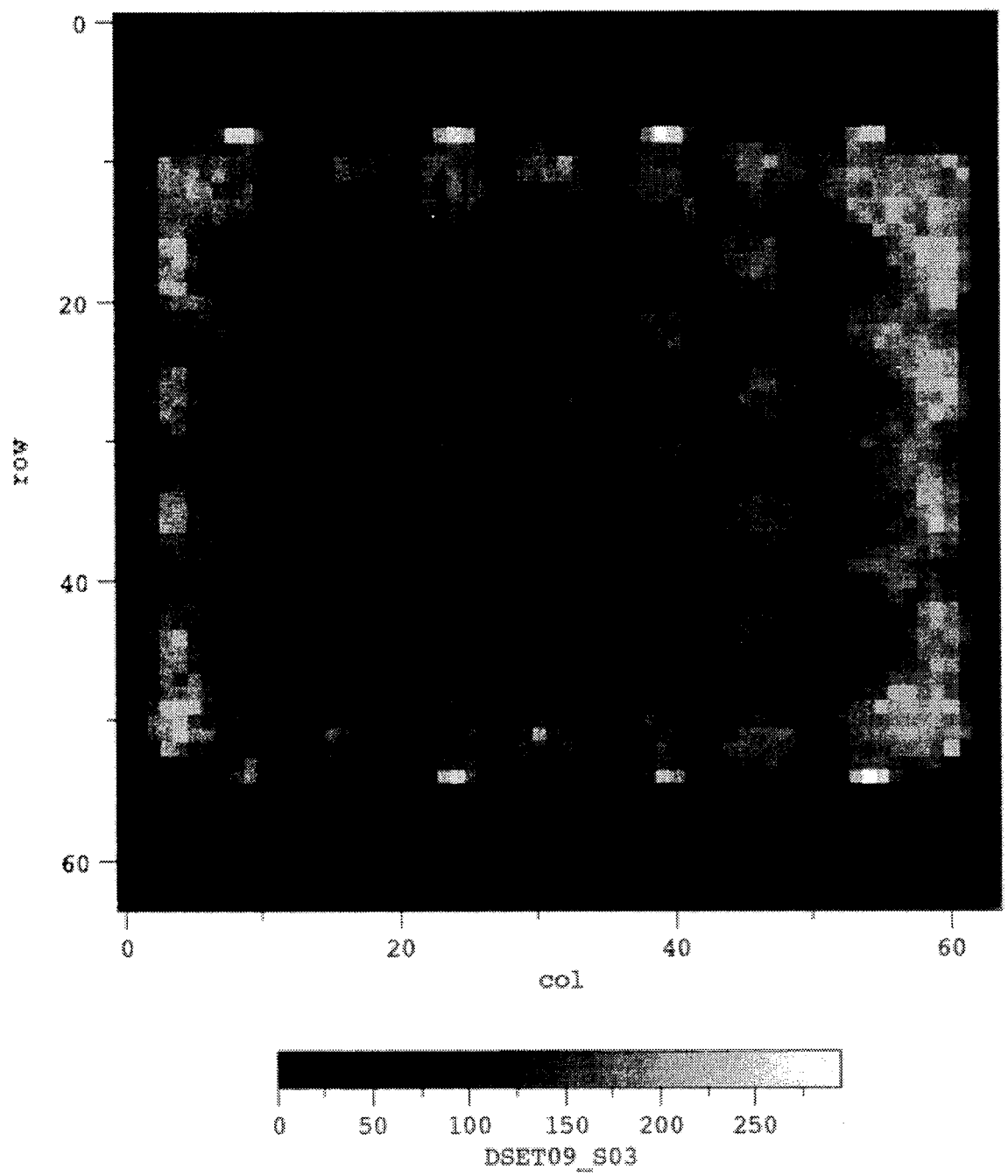
Figure 1J:
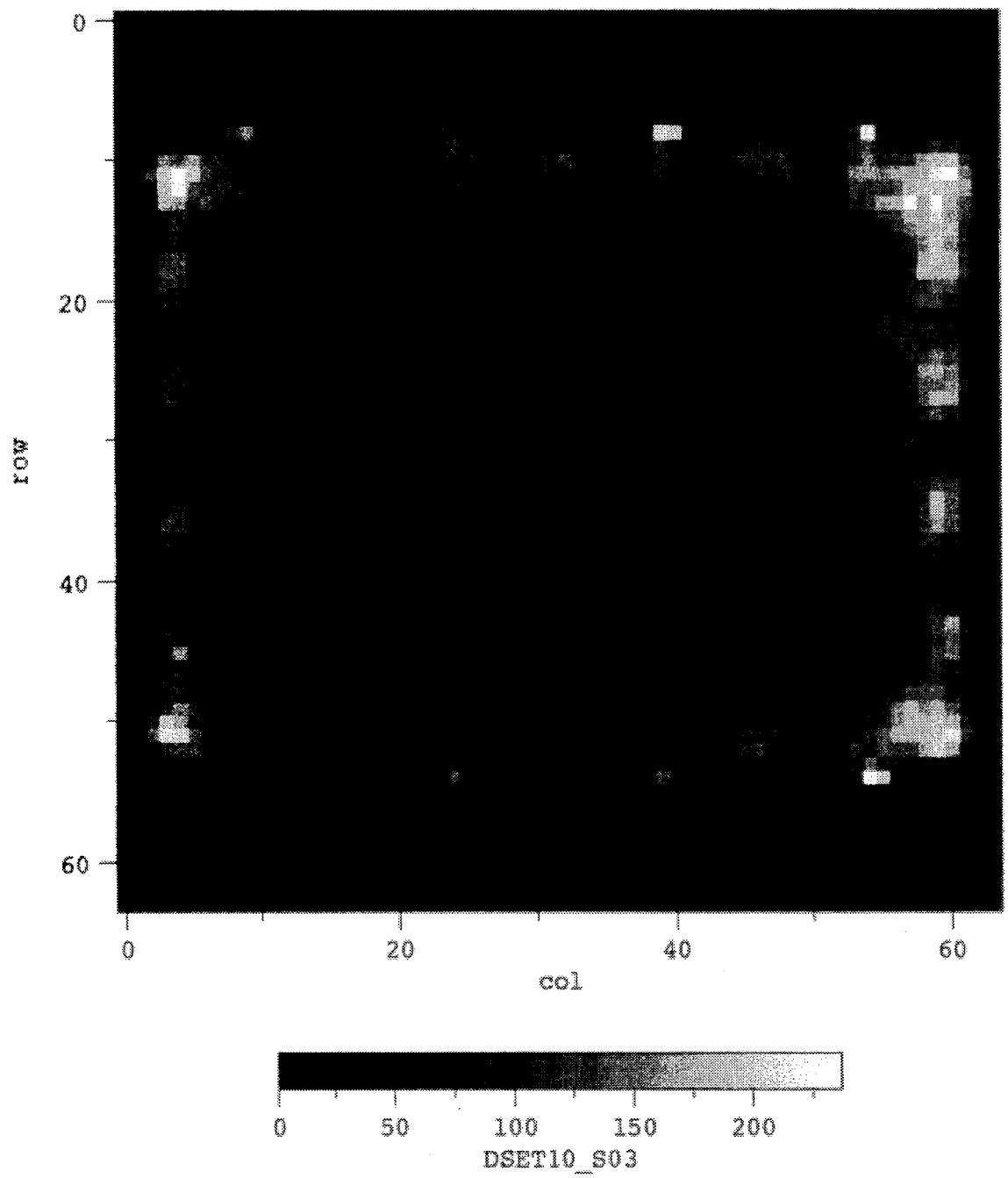
Figure 1K:
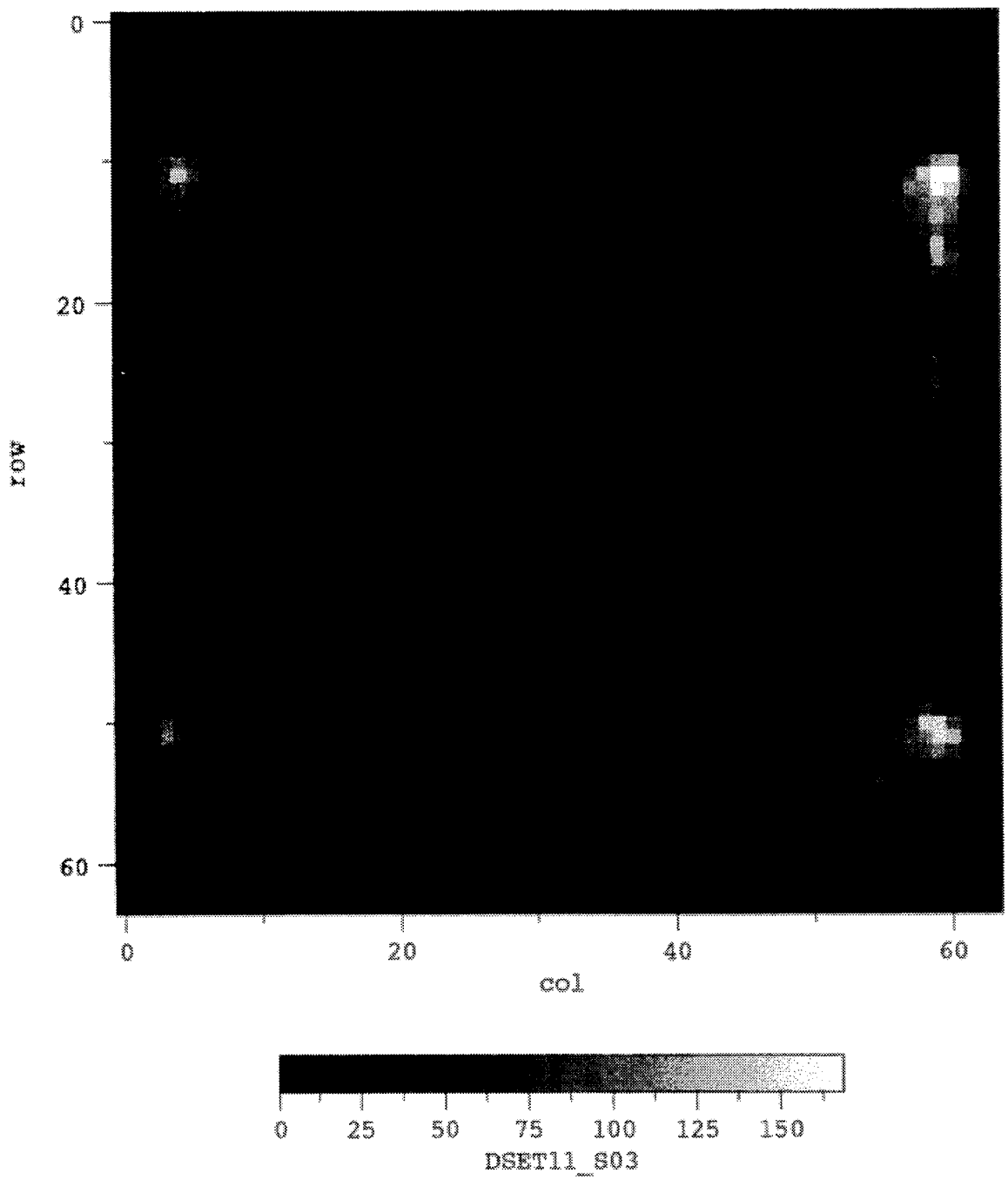

FIGS. 1A–1K illustrate a sequence of eleven images of a uniform flood field of radiation, without scatter, acquired with narrow energy windows of 4 keV in width, ranging from 110–154 keV, as part of a calibration method. The energy signals of each detected event are not corrected for variations as a function of spatial position. With the data for the eleven images as shown in FIGS. 1A–1K, the response of the gamma camera to unscattered radiation events as a function of energy and spatial position can be calculated.

As is evident from the sequence of calibration images in FIGS. 1A–1K, the light collection capability and response of the PMTs varies as a function of the spatial positioning of the PMT relative to gamma-ray absorption in the crystal. As seen in the sequence, absorptions occurring over the centers of the PMTs result in greater light collection, and therefore the centers of the PMTs produce a brighter image in the higher energy windows (note the images corresponding to the 138–142 keV and 142–146 keV windows). Another way of describing this behavior is that since the mean signal generated for an absorption over the center of a PMT is greater than that generated for an absorption occurring elsewhere, the peak of the energy spectrum for these events occurs at a higher energy. Conversely, the absorption events occurring between tubes peak at lower energies (note the images corresponding to the 126–130 and 130–134 keV windows).

The response of the gamma camera can be calculated for each spatial position by fitting a function to the calibration image data acquired over the entire energy range (i.e., eleven data points) to thereby approximate the shape of the response to incident unscattered radiation events. One suitable function for fitting to the data points is the Gaussian distribution function, since each gamma-ray absorption event in the crystal would produce a mean of 500–700 scintillation photons, and ideally the actual number of photons produced would be perfectly random. However, other empirically derived functions may also be used for fitting to the data points to account for non-idealities which cause some deviation from a pure Gaussian distribution. In the present embodiment, a Gaussian function was fitted to the 11 data point spectrum (i.e., from 110 to 154 keV, wherein each data point represents the number of radiation events detected in a specific 4 keV window) for each spatial position using the so-called Levenberg-Marquandt method for nonlinear fitting. Fitting of the function involved determining three parameters for each spatial position or pixel of the image: the centroid or peak value of the Gaussian function $e_0$, the standard deviation of the Gaussian function, $\sigma$, and the amplitude of the peak value, a.

The spatially varying nature of the scintillation photon collection process causes the mean or average number of scintillation photons detected for gamma-ray absorptions of identical energy to be different for each spatial location. As a result, the fitted response function will exhibit a variation in the width of the distribution (by virtue of varying $\sigma$'s) over different spatial positions as well as a shift in the centroid values $e_0$. For a perfectly uniform flood source of incident gamma radiation over the face of the crystal and a perfectly uniform crystal, the area under the response curves should be constant. Therefore, the shapes of the fitted response functions are an indication of not only the spatially dependent energy variation, but also are a measure of the uniformity more precisely the degree of nonuniformity over the face of the crystal).

Once the response of the gamma-ray camera has been calculated for each spatial location as described above, the correction of acquired image data containing a spatially varying distribution of unscattered (or so-called photopeak) radiation events and scattered radiation events is performed by fitting the acquired data with a combination of the calculated unscattered response function and a derived spectral model of the scattered contribution to the acquired data. In fitting the acquired data with the combination of functions, it is assumed that the total number of events or counts in each narrow energy window for each spatial location is a linear combination of the unscattered or photopeak response and the scattered spectral model. The calculated Gaussian response function for each spatial location is characterized by the value of its centroid energy, $e_0$, and its standard deviation, $\sigma$, as determined in the calibration step. Thus, only the amplitude of the peak value, a, remains unknown. A good assumption for the shape of the scattered contribution is a linear background. Thus, there exist two parameters to determine for the scattered spectrum: the slope of the linear background spectrum and the height of the background spectrum at one energy. A nonlinear fit can be performed to find the minimum variance solution for all three unknown parameters. Alternatively, the linear background shape can be fitted to data points in the energy spectrum above and below the peak of the Gaussian distribution. Once the amplitude of the photopeak distribution is computed, the number of unscattered events at each spatial location is simply the integral of the photopeak curve (i.e., the sum of the unscattered events over all of the narrow energy windows).

Because of the random statistical nature of gamma-ray detection and the relatively low number of radiation events which are typically recorded in a single pixel of a clinical image, it is desirable to fit the calibration photopeak response function and the background scatter function using an image matrix size which is a compromise between a small pixel size (and thus a larger number of pixels in the matrix) needed to obtain the fine spatial resolution desired for particular clinical imaging studies and a large pixel size (and thus a smaller number of pixels in the matrix) containing statistically significant numbers of recorded events, which would produce a coarser image resolution. One solution would be to acquire the sequence of calibration images in a 64×64 pixel matrix over the entire field of view (FOV) of the camera, for a total of 4,096 spatial positions or pixels covering the entire field of view. The size of each pixel must be large enough to contain a sufficient number of recorded events to be statistically valid so that the calculation of the photopeak response function will not be dominated by random noise. During clinical imaging, the same energy range sequence of images with the same pixel matrix size would be acquired. If a smaller pixel size is desired for the final image (thus resulting a larger number of pixels covering the same field of view) in order to obtain a higher resolution image, then a sequence of images of the smaller pixel size may be either simultaneously recorded with the same detected events, or the sequence of narrow energy images can be recorded only in the smaller pixel size and rebinned into the coarser image matrix after the acquisition has been completed. However, this second alternative would require far more computer memory than the first alternative. As an example of the first method, the sequence of eleven images spanning the energy range of 110–154 keV in 4 keV increments could be acquired in 64×64 pixel matrices. If a higher final image resolution was desired, such as a 512×512 pixel matrix, then all the same events would be simultaneously recorded in a single $512^2$ pixel matrix encompassing the entire energy range of 110–154 keV.

Where the final desired image matrix is $512^2$, the fitting of the photopeak response function to the acquired image data can be performed in the $64^2$ matrix to obtain the number of unscattered or photopeak events or counts in each pixel. The ratio of photopeak counts to total counts in each pixel of the 642 matrix is then computed. Since each single pixel in the $64^2$ matrix corresponds to an 8×8 array of pixels in the $512^2$ matrix (64×8=512), each of the 8×8 pixels in the $512^2$ matrix corresponding to a single pixel in the $64^2$ matrix are multiplied by the computed ratio for that corresponding single pixel in the $64^2$ matrix in order to determine the corresponding photopeak counts in each of the pixels in the $512^2$ matrix. This technique assumes that the ratio of scatter to unscattered events does not vary significantly over the area of a single pixel in the $64^2$ matrix; thus, the pixels in the high resolution image are preserved and scatter-corrected individually, while the scatter fraction in the $64^2$ matrix is assumed to be locally constant. This assumption achieves good results since in a typical imaging of a distributed radiation source within the human body, the scatter contribution to the point spread function is seen as broad tails extending up to several centimeters from the centroid of the distribution, while the spatial extent of a single pixel in the $64^2$ matrix is less than 1 cm.

Test Results

To demonstrate the feasibility of the present invention in obtaining scatter-corrected images from a gamma-ray camera a test was performed utilizing the calibration images described above to correct a sequence of images with scatter present.

Figure 2A:
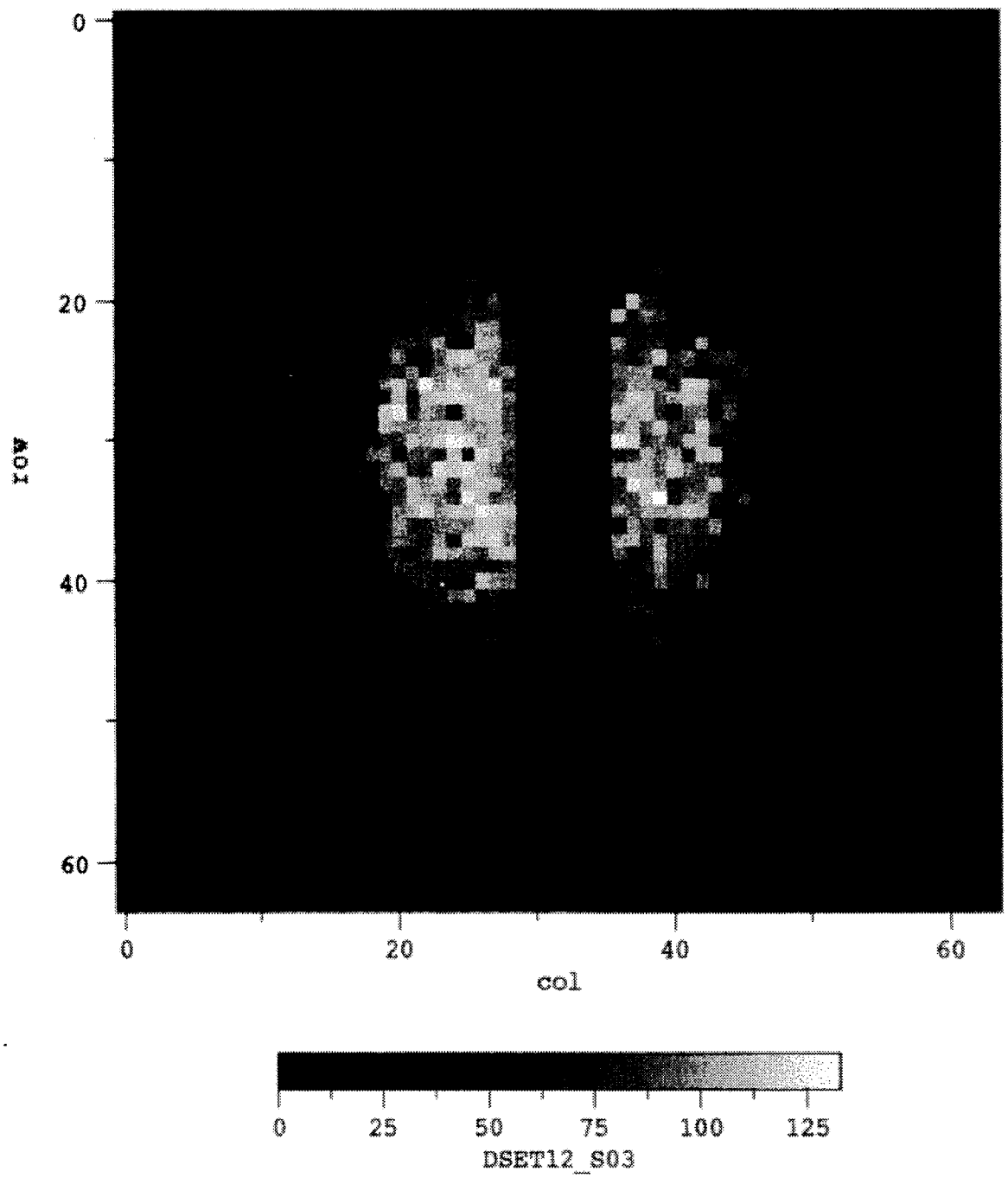
FIGS. 2A–2K are computer generated views of a sequence of images taken at different narrow energy ranges of a radiation test object with scattered radiation events present.
Figure 2B:
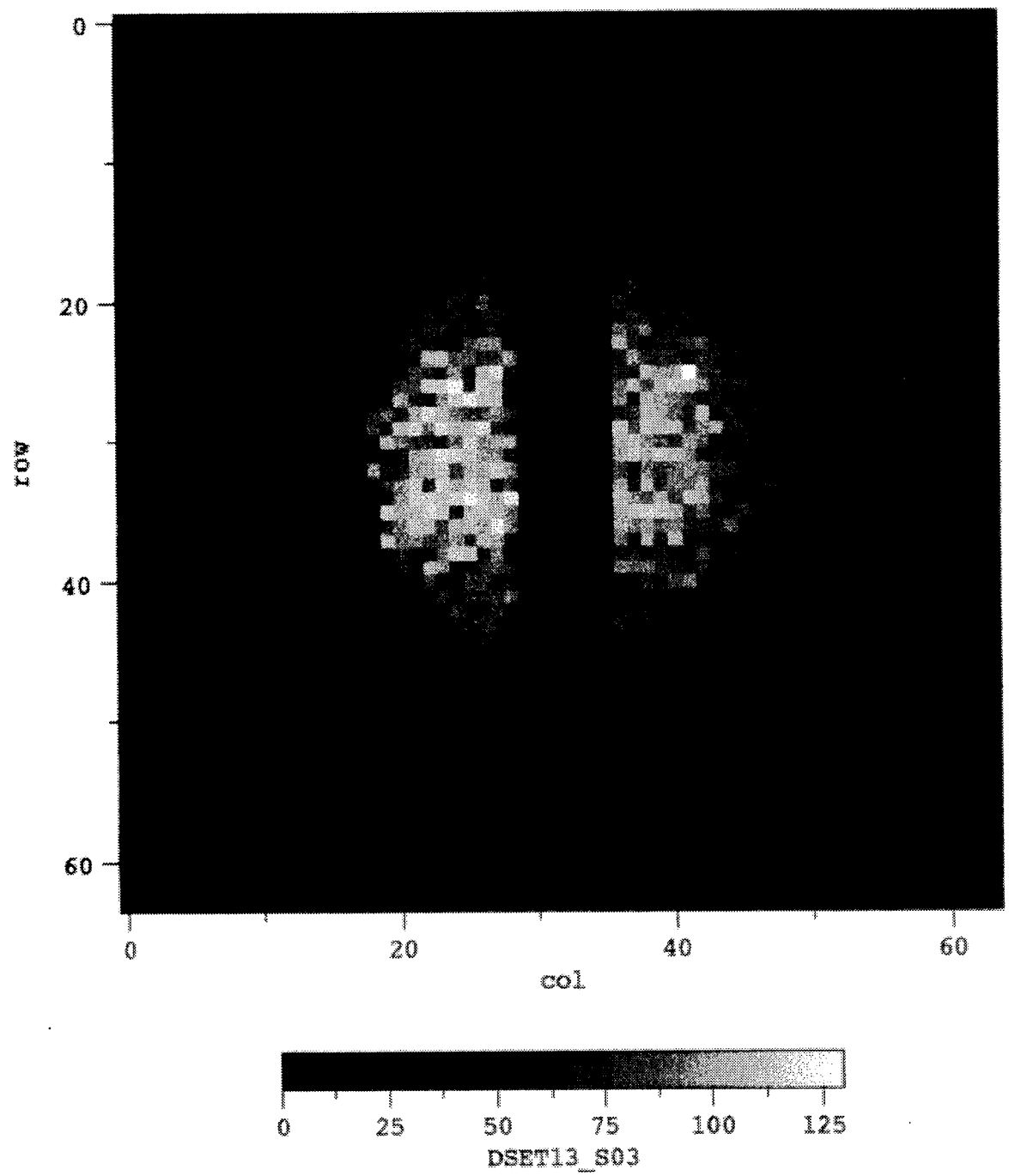
Figure 2C:
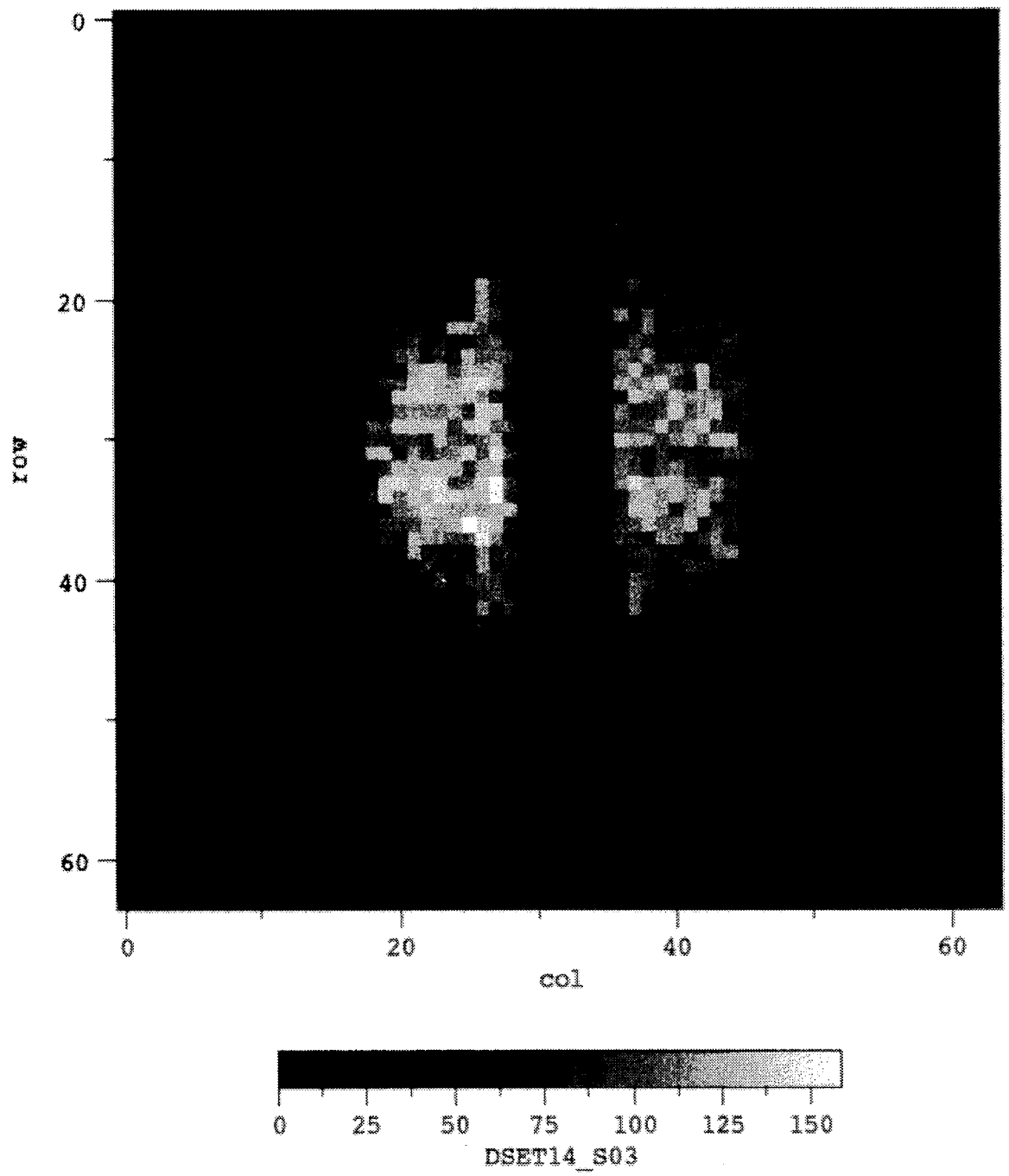
Figure 2D:
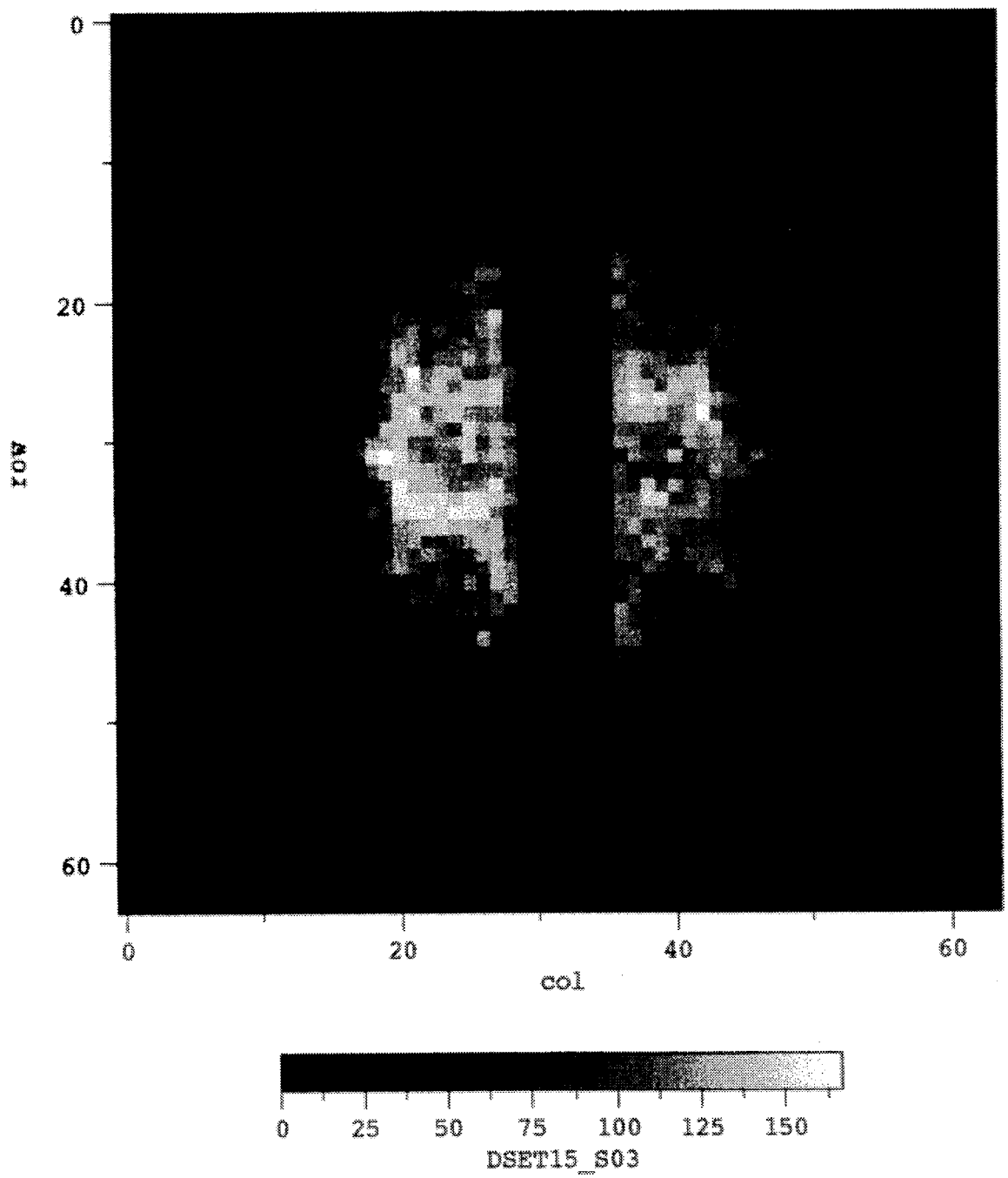
Figure 2E:
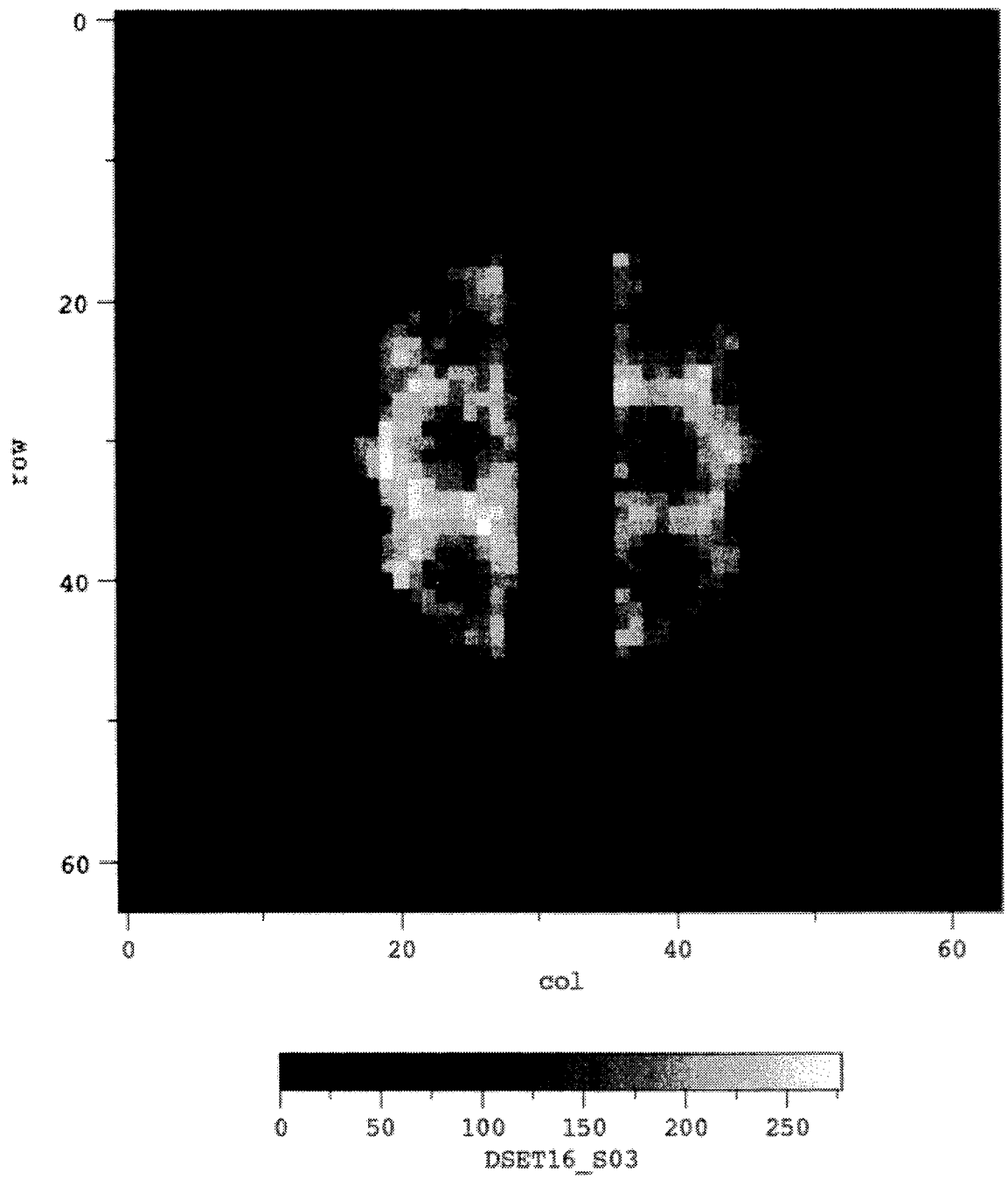
Figure 2F:
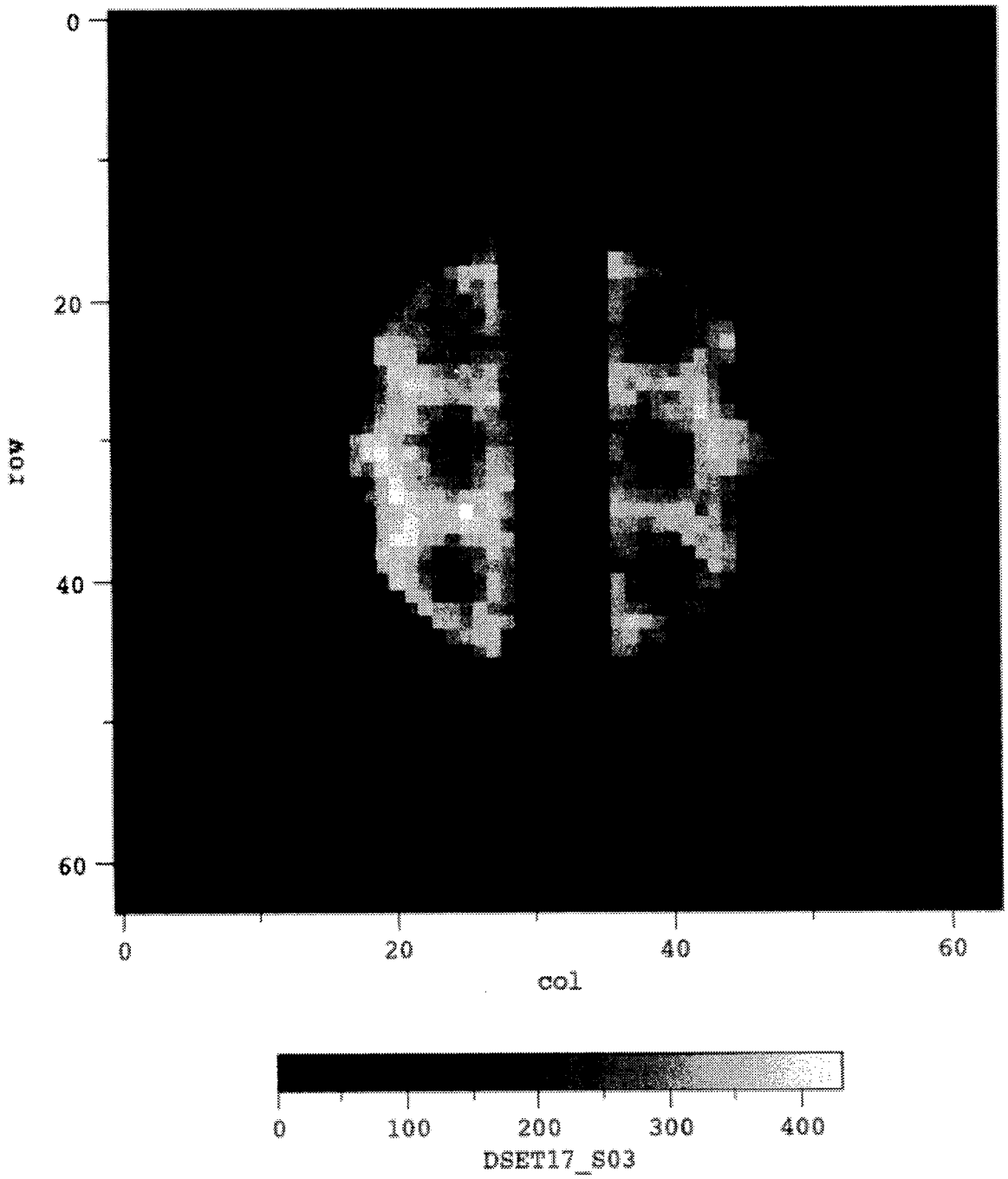
Figure 2G:
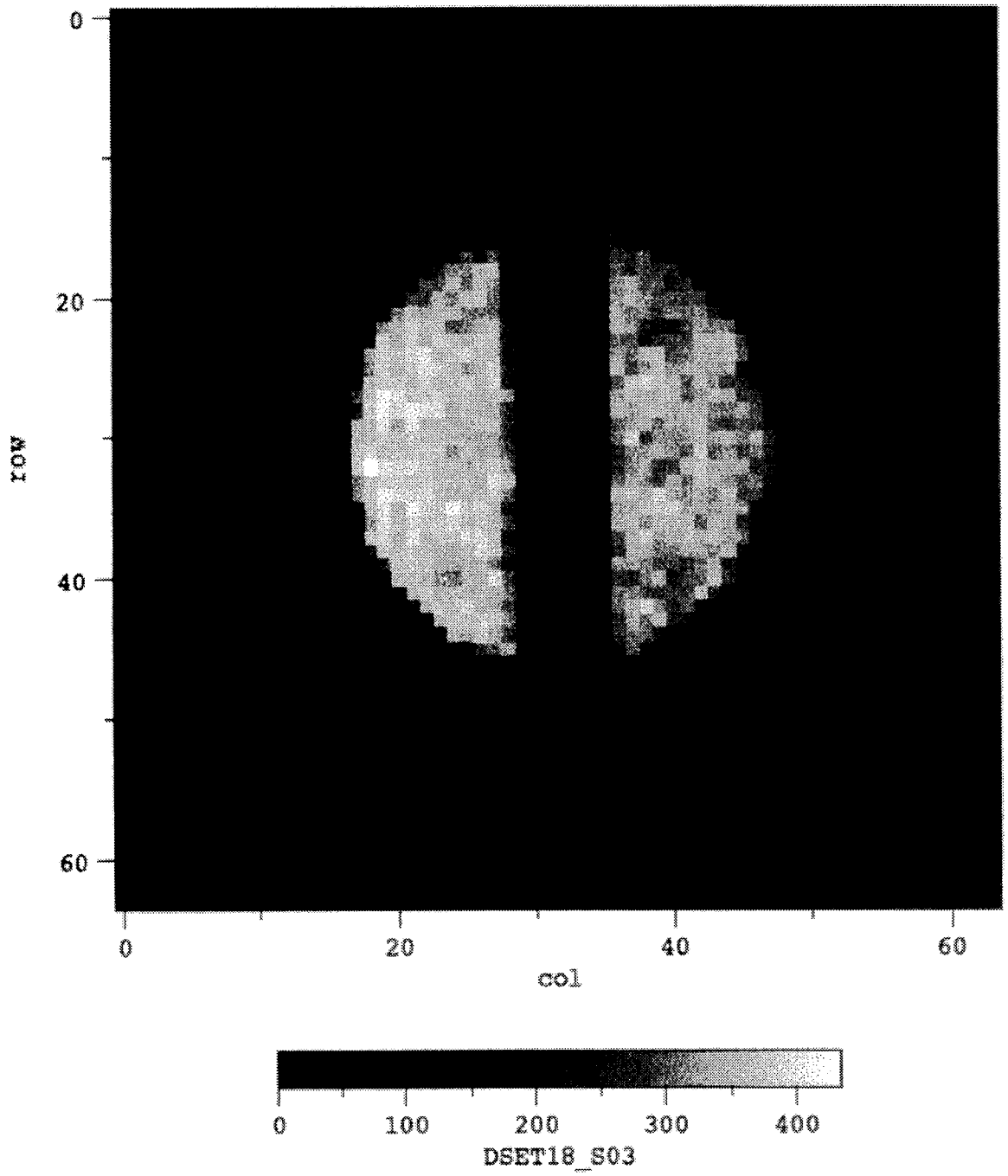
Figure 2H:
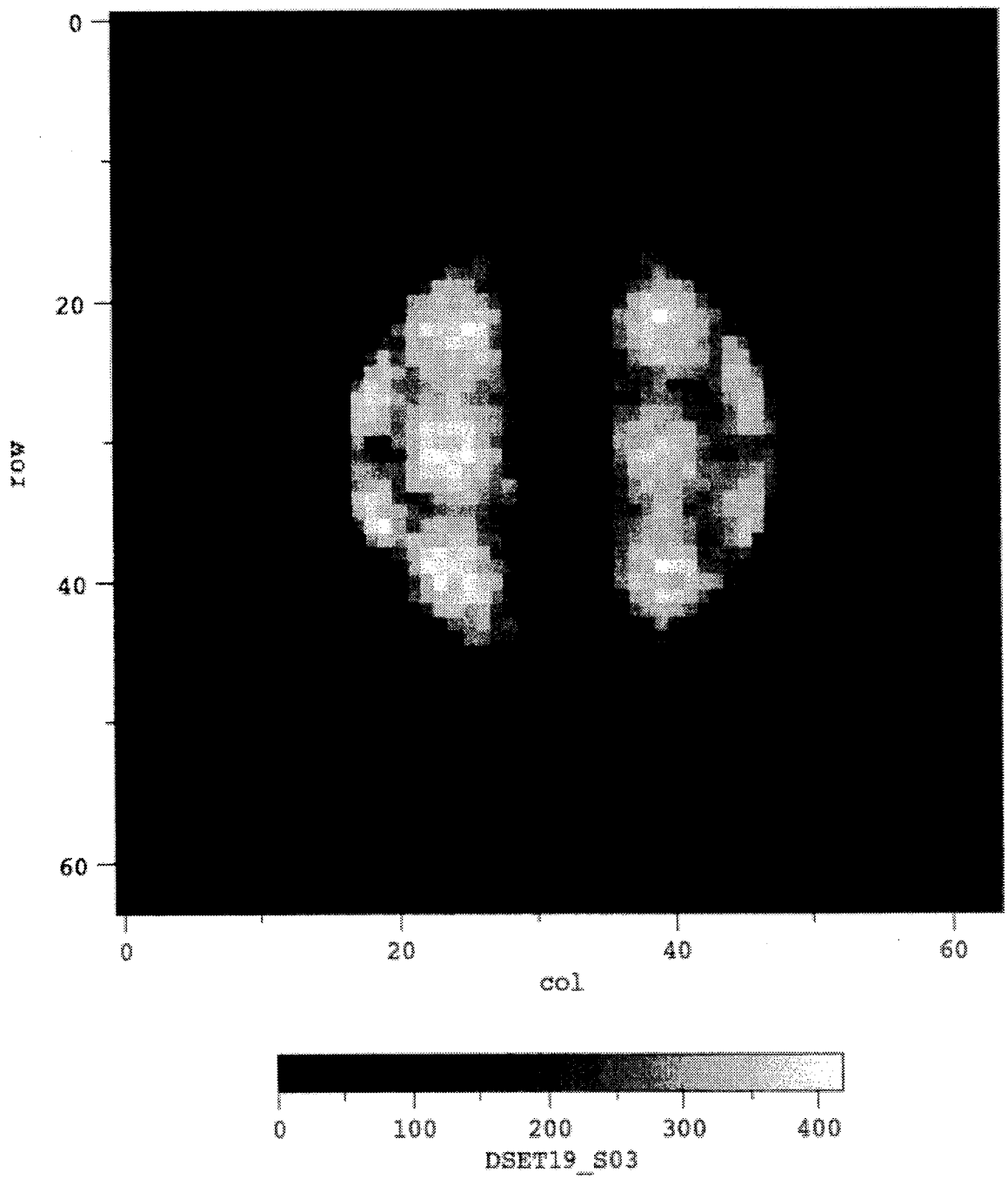
Figure 2I:
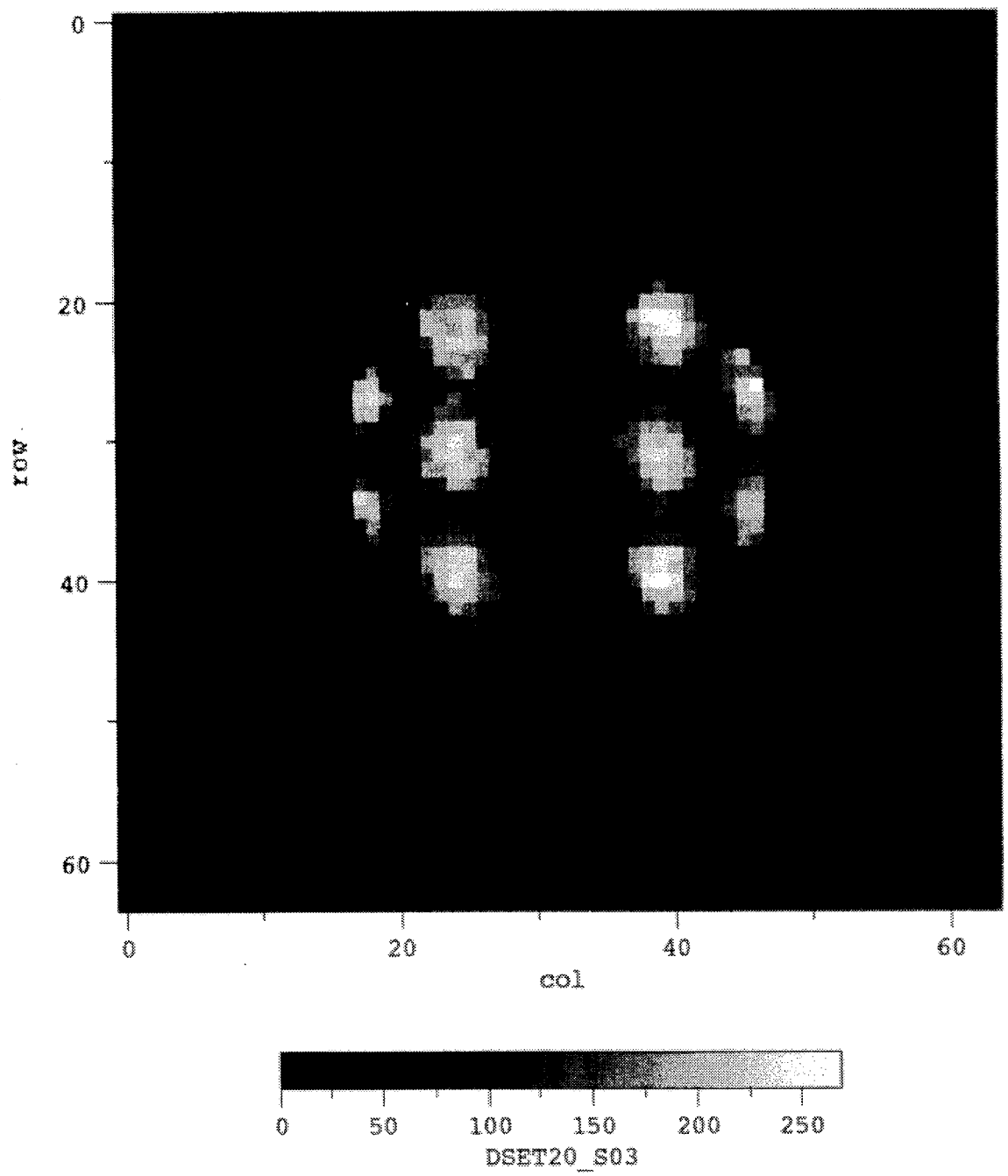
Figure 2J:
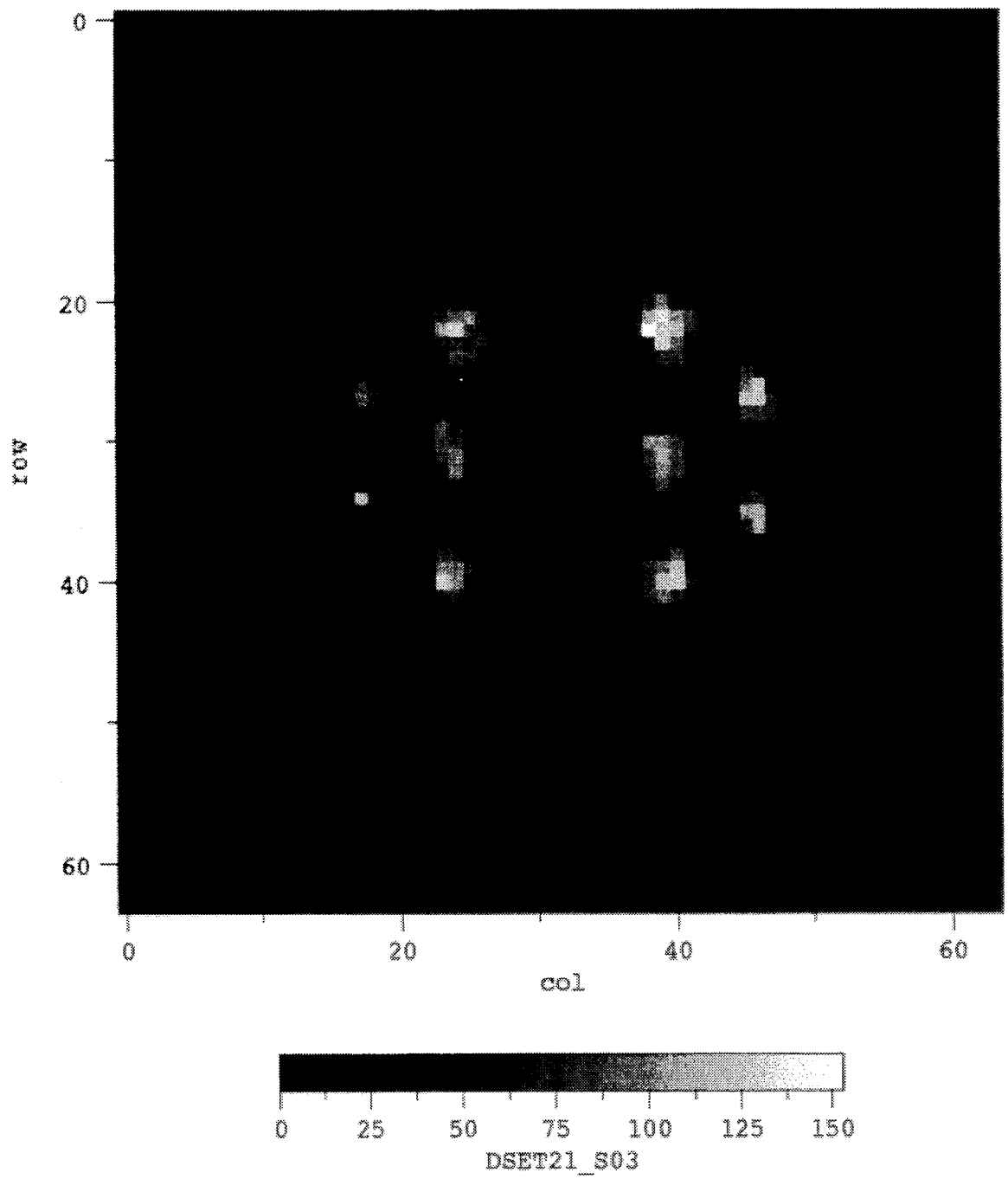
Figure 2K:
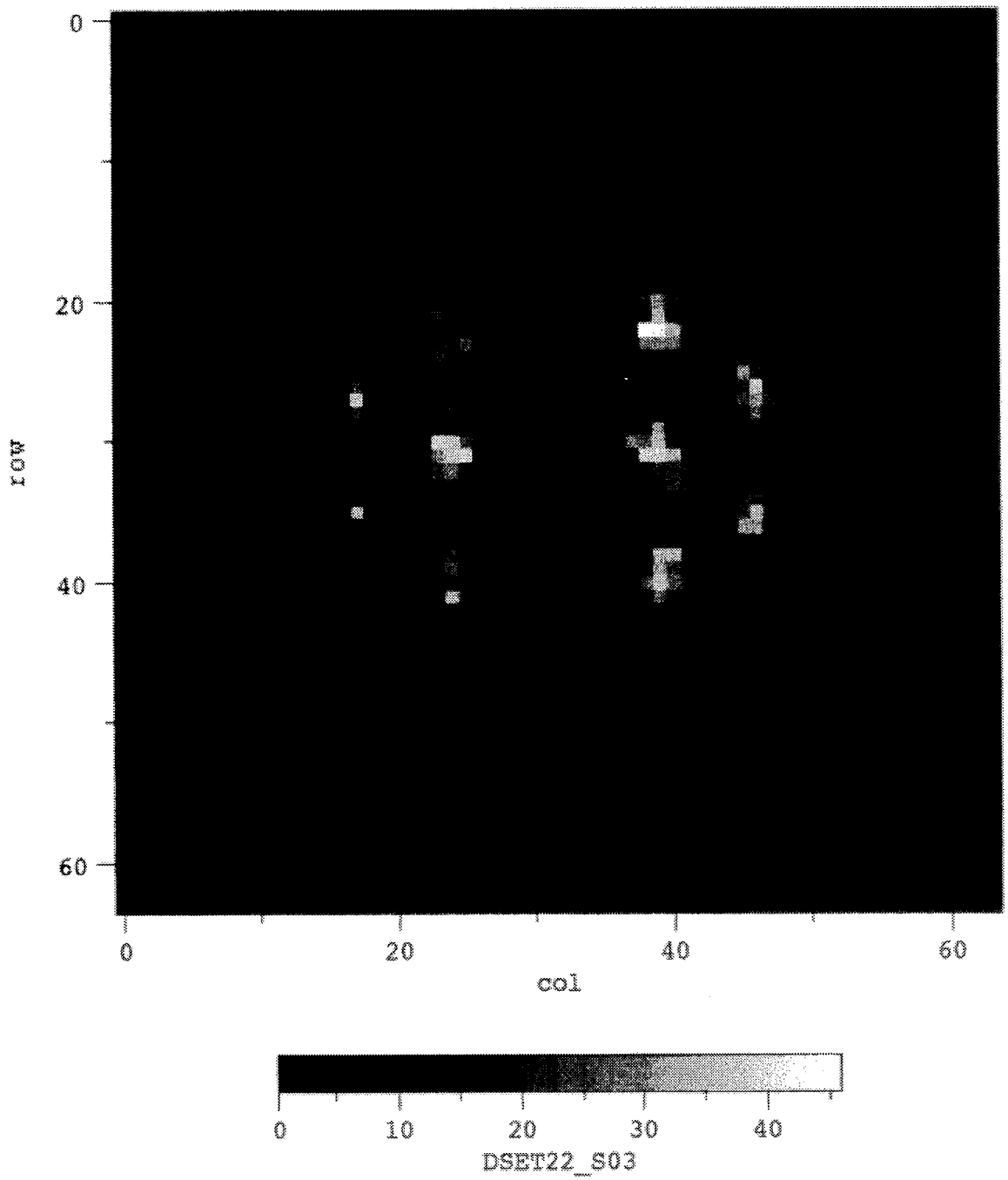

A test object was constructed by placing water-filled plastic disks of 5 cm total thickness directly on the collimator face of a gamma-ray camera as a scattering medium, placing two abutting lead strips on top of the disks, and placing the circular end of a cylindrical phantom filled to a depth of 10 cm with water and 2 mCi (milliCuries) of $^{99m}$Tc on top of the abutting lead strips. FIGS. 2A–2K illustrate a sequence of eleven images of the test object obtained with 4 keV energy windows over the range of 110–154 keV.

Gaussian photopeak response functions calculated for each spatial position in the unscattered calibration step were fitted to the corresponding energy spectra over the sequence of eleven energy windows for each pixel of the test object image. The scattered gamma-ray spectra were assumed to have a simple linear background shape. The linear fit was performed by taking only the lowest (110–114 keV) and highest (15–154 keV) energy window images, smoothing these images using a standard [1,2,1] filter kernel for a single vertical and horizontal pass. The value of each pixel in the Minimum energy image and the maximum energy image was used to compute a line over the entire energy spectrum. This line was used to subtract background counts from each of the eleven energy windows for each pixel. A nonlinear fit was then performed on the background-subtracted data by taking the centroid $e_0$ and standard deviation $\sigma$ of the calibration response function for each pixel and solving for the amplitude a which best fit the eleven point spectrum for that pixel. The calculated a values were assumed to be proportional to the photopeak events and were thus used as the final image of unscattered incident events detected by the camera. The results of this test showed a dramatic reduction in the contribution of scatter to the image.

A profile of the spatial distribution of the radiation test object is shown in FIG. 3. To obtain this profile, the sum of the events in all of the energy windows, which would be equivalent to a 25% window, was computed. The profile is comprised of the sum of eight lines of pixels through the center of the object perpendicular to the lead strips. The double humped curve illustrates the source region with the lead strips causing the sharp drop in the center. The small peak in the very center of the curve represents the slight penetration of gamma-rays through the space between the abutting lead strips. It will be noted that the tops of the humps are considerably rounded due to scatter and the scatter falls off from the edge of the source regions as shown by the extended tail regions.

FIG. 4 shows a plot of data points obtained by scatter-correcting the pixel values used in the curve of FIG. 3. The data points of FIG. 4 correspond to the calculated amplitudes a of the Gaussian fits for each pixel. FIG. 5 shows the scatter-corrected pixel values of FIG. 4 overlayed on the summed scatter image profile of FIG. 3. As seen, the tops of the source regions are flattened and the scatter tails extending away from the source region are virtually eliminated. Additionally, the amplitude under the lead strips is effectively zero. As seen from FIG. 5, the method of obtaining images according to the present invention is effective for virtually eliminating scattered radiation events from the image while significantly increasing the number of unscattered events which contribute to the image.

It is to be noted that the technique of the present invention can be applied to routine clinical nuclear medical imaging using a variety of photopeak and background spectrum fitting functions in addition to the functions described hereinabove. Many variations and enhancements may be made to the algorithms and methods used as a result of the simple assumptions made in the above test; however it is clear that the present invention effectively eliminates the contribution of scatter to a nuclear medical image by extracting the photopeak from a sequence of non-energy corrected images.

The present invention achieves many significant advances in the art. First, the function fitted to the photopeak in the calibration procedure is calculated for the response of the detector at each spatial location over the field of view. Thus, the shape of the response is not constrained to a single averaged shape for the entire image. Previous methods of scatter corrections, such as in the aforementioned U.S. Pat. No. 4,83,808, used a fitted shape for the unscattered or photopeak events, but since an energy correction had already been performed in order to align the mean values of the photopeaks, the fitted shape represented an averaged value for the entire detector area. Thus, while the magnitude of the photopeak varied with position, the shape of the distribution function remained constant. The present invention eliminates the need to perform an energy correction by fitting a unique function to the photopeak events for each spatial location. The fitting function thus models the width as well as the amplitude of the camera response as a function of spatial location. The area under the photopeak function curve is proportional to the total number of unscattered radiation events detected by the camera. The area under the photopeak curve can then be calculated through integration.

The present invention further directly derives the unscattered radiation events detected during an image acquisition, which is the desired quantity in nuclear medical imaging. The conventional method of accepting radiation events whose energies fall within a fixed window fails to exclude many events which have scattered through small angles and thus still lie within the energy window. Additionally, since the method of the present invention takes into account the spatially variant nature of the response of the detector, nonuniformities associated with applying fixed energy windows to varying width photopeak distributions are eliminated.

The invention having been thus described, it will be obvious to those skilled in the art that the same may be varied in many ways without departing from the spirit and scope of the invention. Any and all such modifications are intended to be included within the scope of the following claims.

What is claimed is:

1. A method of obtaining an image of a distributed field of radiation from acquired radiation event data detected by a nuclear imaging apparatus, which acquired radiation event data includes scattered radiation event data, comprising the steps of:

acquiring image data of a uniform flood field of radiation in the absence of scattered radiation for each of a plurality of energy ranges corresponding to energy states of detected radiation events from said uniform flood field;

grouping said image data for each of said plurality of energy ranges into a plurality of first image elements corresponding to different spatial locations in a field of view of said nuclear imaging apparatus at which said detected radiation events occur;

for each of said first image elements, calculating a response of said nuclear imaging apparatus by fitting a calibration function to the distribution of data over the entirety of said plurality of energy ranges;

acquiring image data of said distributed field of radiation for each of said plurality of energy ranges;

grouping said distributed field image data for each of said plurality of energy ranges into said plurality of first image elements;

for each of said first image elements of said distributed field image data, fitting a combination of a particular scattered radiation spectrum and said calculated response of the nuclear imaging apparatus to the distribution of data points over the entirety of the plurality of energy ranges by calculating fitted parameters of said combination such that the combination is a best fit to the distribution of data points;

deriving unscattered image data from said calculated fitted parameters; and obtaining said image of said distributed field of radiation from said derived unscattered image data.

2. A method of obtaining an image of a distributed field of radiation according to claim 1, wherein said plurality of energy ranges comprises eleven energy ranges each of 4 keV width, from 110–154 keV.

3. A method of obtaining an image of a distributed field of radiation according to claim 1, wherein said plurality of first image elements comprises a matrix of 64×64 image elements.

4. A method of obtaining an image of a distributed field of radiation according to claim 1, wherein said calibration function is a Gaussian distribution function.

5. A method of obtaining an image of a distributed field of radiation according to claim 1, further including the step of simultaneously grouping said distributed field image data for each of said plurality of energy ranges into a plurality of second image elements along with the grouping of said distributed field image data into said plurality of first image elements, wherein said plurality of second image elements is of finer spatial resolution than said plurality of first image elements.

6. A method of obtaining an image of a distributed field of radiation according to claim 5, further including the step of correcting image data in said plurality of second image elements to remove scatter events therefrom by applying correction factors to said image data in said plurality of second image elements obtained from calculated values of unscattered image data and scatter data in corresponding ones of said plurality of first image elements determined from said fitted parameters.

7. A method of obtaining an image of a distributed field of radiation according to claim 1, wherein said scattered radiation spectrum has a linear spectral shape.

8. A method of obtaining an image of a distributed field of radiation according to claim 1, further including the step of grouping said distributed field image data for each of said plurality of energy ranges into a plurality of second image elements subsequent to the grouping of said distributed field image data into said plurality of first image elements, wherein said plurality of second image elements is of coarser spatial resolution than said plurality of first image elements.

9. A method of obtaining an image of a distributed field of radiation according to claim 1, wherein said nuclear imaging apparatus is a gamma-ray camera.

10. A method of removing scatter radiation events from image data acquired by a nuclear imaging apparatus, comprising the steps of:

obtaining a separate photopeak response function for each of a plurality of different spatial locations over the field of view of said nuclear imaging apparatus, wherein the photopeak response functions represent the response of said nuclear imaging apparatus to incident unscattered radiation events of a single specific energy value;

acquiring image data from a distributed radiation field in the presence of scatter;

deriving a separate scatter function for each of a plurality of spatial locations of said image data;

subtracting scatter data from said image data according to said derived separate scatter functions; and calculating unscattered image data from said scatter-subtracted image data by fitting said scatter-subtracted image data with said photopeak response functions.

11. A method of obtaining an image of a distributed field of radiation from acquired radiation event data detected by a nuclear imaging apparatus, which acquired radiation event data includes scattered radiation event data, comprising the steps of:

acquiring image data of a uniform flood field of radiation in the absence of scattered radiation for each of a plurality of energy ranges corresponding to energy states of detected radiation events from said uniform flood field;

grouping said image data for each of said plurality of energy ranges into a plurality of first image elements corresponding to different spatial locations in a field of view of said nuclear imaging apparatus at which said detected radiation events occur;

for each of said first image elements, calculating a response of said nuclear imaging apparatus by fitting a calibration function to the distribution of data over the entirety of said plurality of energy ranges;

acquiring image data of said distributed field of radiation for each of said plurality of energy ranges;

grouping said distributed field image data for each of said plurality of energy ranges into said plurality of first image elements;

for each of said first image elements of said distributed field image data, calculating a scattered radiation spectrum by fitting a scatter function to the distribution of data over the entirety of said plurality of energy ranges;

subtracting scatter data corresponding to said calculated scattered radiation spectrum from said image data of each of said first image elements of said distributed field image data;

calculating a photopeak function of unscattered image data for each of said first image elements by fitting said calculated response of said nuclear imaging apparatus to said scatter-subtracted data;

deriving unscattered image data from said calculated photopeak functions; and obtaining said image of said distributed field of radiation from said derived unscattered image data.

12. A method of obtaining an image of a distributed field of radiation according to claim 11, wherein said plurality of energy ranges comprises eleven energy ranges each of 4 keV width, from 110–154 keV.

13. A method of obtaining an image of a distributed field of radiation according to claim 11, wherein said plurality of first image elements comprises a matrix of 64×64 image elements.

14. A method of obtaining an image of a distributed field of radiation according to claim 11, wherein said calibration function is a Gaussian distribution function.

15. A method of obtaining an image of a distributed field of radiation according to claim 11, further including the step of simultaneously grouping said distributed field image data for each of said plurality of energy ranges into a plurality of second image elements along with the grouping of said distributed field image data into said plurality of first image elements, wherein said plurality of second image elements is of finer spatial resolution than said plurality of first image elements.

16. A method of obtaining an image of a distributed field of radiation according to claim 15, further including the step of correcting image data in said plurality of second image elements to remove scatter events therefrom by applying correction factors to said image data in said plurality of second image elements obtained from the calculated values of unscattered image data and scatter data in corresponding ones of said plurality of first image elements.

17. A method of obtaining an image of a distributed field of radiation according to claim 11, wherein said scatter function has a linear spectral shape.

18. A method of obtaining an image of a distributed field of radiation according to claim 11, further including the step of grouping said distributed field image data for each of said plurality of energy ranges into a plurality of second image elements subsequent to the grouping of said distributed field image data into said plurality of first image elements, wherein said plurality of second image elements is of coarser spatial resolution than said plurality of first image elements.

19. A method of obtaining an image of a distributed field of radiation according to claim 11, wherein said nuclear imaging apparatus is a gamma-ray camera.

* * * * *